(12) United States Patent
Hirata et al.

(10) Patent No.: US 10,920,657 B2
(45) Date of Patent: Feb. 16, 2021

(54) AIR INTAKE PASSAGE STRUCTURE FOR ENGINE

(71) Applicant: MAZDA MOTOR CORPORATION, Hiroshima (JP)

(72) Inventors: Toshihiko Hirata, Hiroshima (JP); Hidesaku Ebesu, Hiroshima (JP); Ryotaro Nishida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 16/492,224

(22) PCT Filed: Feb. 20, 2018

(86) PCT No.: PCT/JP2018/005868
§ 371 (c)(1),
(2) Date: Sep. 9, 2019

(87) PCT Pub. No.: WO2018/180000
PCT Pub. Date: Oct. 4, 2018

(65) Prior Publication Data
US 2020/0040854 A1 Feb. 6, 2020

(30) Foreign Application Priority Data
Mar. 30, 2017 (JP) .............. JP2017-067678

(51) Int. Cl.
| | |
|---|---|
| *F02B 29/04* | (2006.01) |
| *F02M 26/06* | (2016.01) |
| *F02B 39/16* | (2006.01) |
| *F02M 35/10* | (2006.01) |
| *F02M 35/112* | (2006.01) |
| *F02M 35/108* | (2006.01) |
| *F02M 26/22* | (2016.01) |

(52) U.S. Cl.
CPC ...... *F02B 29/0475* (2013.01); *F02B 29/0406* (2013.01); *F02B 29/0468* (2013.01); *F02B 39/16* (2013.01); *F02M 26/06* (2016.02); *F02M 35/108* (2013.01); *F02M 35/10157* (2013.01); *F02M 35/10222* (2013.01); *F02M 35/10255* (2013.01); *F02M 35/10275* (2013.01); *F02M 35/112* (2013.01); *F02M 26/22* (2016.02)

(58) Field of Classification Search
CPC .............. F02B 29/0406; F02B 29/0468; F02B 29/0475; F02B 39/16; F02M 26/03; F02M 26/04; F02M 26/06; F02M 26/17; F02M 35/10; F02M 35/10052; F02M 35/10157; F02M 35/10222; F02M 35/10255; F02M 35/10275; F02M 35/104; F02M 35/108; F02M 35/112; F02M 26/22
See application file for complete search history.

(56) References Cited

U.S. PATENT DOCUMENTS

| | | | | |
|---|---|---|---|---|
| 4,612,771 A | * | 9/1986 | Ando ............... | F02B 33/446 60/611 |
| 2011/0232598 A1 | * | 9/2011 | Harada ............. | F02M 29/00 123/184.47 |

* cited by examiner

*Primary Examiner* — Brandon D Lee
(74) *Attorney, Agent, or Firm* — Studebaker & Brackett PC

(57) ABSTRACT

An air intake passage (30) has a third passage (37) that connects an intercooler (36) and a bottom portion of a surge tank (38) such that the intercooler (36) is positioned below the surge tank (38). A pair of wall portions (71, 72) configured to catch moisture is formed in a section from an upstream end portion of the third passage (37) to a connected portion between said third passage (37) and the surge tank (38).

10 Claims, 15 Drawing Sheets

AIR INTAKE PASSAGE STRUCTURE FOR ENGINE

TECHNICAL FIELD

A technique disclosed herein relates to an air intake passage structure for an engine.

BACKGROUND ART

In PTL 1, an air intake system for an inline-four engine is disclosed as an example of an air intake passage structure for a multi-cylinder engine. This air intake system is configured to include: independent passages (internal passages in a downstream branch pipe section) respectively connected to the four cylinders; and a surge tank (a collection portion in the downstream branch pipe section) that is common to the independent passages and is arranged along an outer surface of an engine body. The surge tank according to PTL 1 is arranged in a manner to oppose a cylinder-opposite-side end (an inlet) of each intake port with each of the independent passages being interposed therebetween, so as to be arranged near the intake ports. With such arrangement, a channel length (a runner length) from the surge tank to each of the intake ports can be shortened.

In addition, in PTL 1, in order to obtain a compact layout of the entire air intake system, it is disclosed that an intercooler is arranged below the surge tank. In this way, the surge tank and the intercooler are vertically adjacent to each other.

Meanwhile, in PTL 2, as another example of the air intake passage structure, a communication pipe that communicates a lower portion of the intercooler and an air intake passage on a downstream side of the intercooler is disclosed. According to this PTL 2, condensed water produced in the intercooler can be drawn by using the communication pipe, and the suctioned condensed water can be discharged to the downstream side of the intercooler.

CITATION LIST

Patent Literature

[PTL 1] JP-A-2013-147953
[PTL 2] JP-A-2014-169632

SUMMARY OF INVENTION

Technical Problem

By the way, when gas that contains moisture is cooled by the intercooler, the condensed water resulted from the moisture is produced in a passage on the downstream side of the intercooler.

For example, in a case of a general engine, the surge tank is arranged on the downstream side of the intercooler. Thus, it is common that such condensed water is produced in the surge tank and accumulated on a bottom surface thereof.

However, in the case where the intercooler is arranged below the surge tank as in PTL 1, the condensed water that flows down by gravity is possibly accumulated in a bottom portion of the intercooler. In such a case, for example, when an engine load is increased, and a flow rate of the gas suctioned from the outside is increased, a large amount of the condensed water is introduced from the intercooler into combustion chambers via the surge tank and the intake ports, which possibly causes water hammer phenomenon. This is inconvenient when sufficient durability of the engine is desirably secured.

To handle such a problem, it is considered to align the surge tank and the intercooler horizontally so as to prevent a reverse flow of the condensed water to the intercooler. However, such a layout is not preferred because the entire engine is enlarged and arrangement of the entire air intake passage is interfered.

In addition, as disclosed in PTL 2, it is considered to communicate between the lower portion of the intercooler and the air intake passage on the downstream side of the intercooler by using the communication pipe. However, such a communication pipe only functions when the sufficient flow rate is secured in the intercooler. Thus, for example, a bypass passage that bypasses the intercooler may be provided in addition to the air intake passage that passes through the intercooler. However, in an engine that includes such a bypass passage and in which the flow rate through the intercooler fluctuates significantly depending on an operation state of the engine, the condensed water is not stably drawn.

The technique disclosed herein has been made in view of such points and therefore has a purpose of obtaining a compact engine and suppressing occurrence of water hammer phenomenon caused by condensed water in an air intake passage structure for the engine.

Solution to Problem

A technique disclosed herein relates to an air intake passage structure for an engine that includes: an intake port that communicates with a combustion chamber; and an air intake passage in which an intercooler and a surge tank are sequentially provided from an upstream side along a flow direction of gas and in which a downstream end portion is connected to the intake port.

The air intake passage is arranged such that the intercooler is positioned below the surge tank in a vehicle-mounted state, and has an introduction passage that connects the intercooler and a bottom portion of the surge tank.

At least one of the introduction passage and the surge tank has a reverse flow prevention structure that suppresses a reverse flow of moisture from a flow of the gas.

According to this configuration, the reverse flow prevention structure is formed in the air intake passage. This structure suppresses the reverse flow of the moisture that is produced in the surge tank or that flows into the surge tank from the outside. In this way, it is possible to suppress occurrence of water hammer phenomenon.

The configuration and vertical alignment of the surge tank and the intercooler can be achieved simultaneously. This is advantageous for configuring the compact engine.

Just as described, according to the configuration, the occurrence of the water hammer phenomenon resulted from condensed water can be suppressed while the engine can be configured to be compact.

The reverse flow prevention structure may be arranged in a section from an upstream end portion of the introduction passage to a connected portion between a downstream end portion of said introduction passage and the surge tank, and may be configured to catch the moisture that flows reversely from the flow of the gas.

According to this configuration, in the air intake passage, the reverse flow prevention structure is formed in the section that includes the passage on a downstream side of the intercooler. Thus, the reverse flow prevention structure can catch the condensed water that is produced in the surge tank or flows into the surge tank from the outside. This configuration is advantageous for suppressing the reverse flow of the condensed water and further suppressing occurrence of the water hammer phenomenon.

The configuration and the vertical alignment of the surge tank and the intercooler can be achieved simultaneously. Even in the case where the condensed water flows downward by gravity, the condensed water can be caught by the reverse flow prevention structure before reaching the intercooler. This is advantageous for configuring the compact engine.

The introduction passage may be connected to the surge tank via an introduction port formed in the bottom portion of said surge tank, and the reverse flow prevention structure may be formed around the introduction port.

According to this configuration, for example, compared to a configuration that the reverse flow prevention structure is formed in an intermediate portion of the introduction passage, it is possible to retain the condensed water near the intake port. As a result, by using a flow of intake air that flows into the surge tank, the condensed water can smoothly be introduced into the combustion chamber. This is advantageous for keeping a stored amount of the condensed water to be small.

The engine has plural cylinders that are arranged in line. The surge tank extends in a cylinder array direction. The air intake passage has: a supercharger provided on an upstream side of the intercooler; and a bypass passage that is branched on an upstream side of the supercharger, bypasses said supercharger and the intercooler, and is connected to the surge tank.

A connected portion between the bypass passage and the surge tank may be set at a position that is offset from both of the introduction port and the reverse flow prevention structure in the cylinder array direction.

For example, in the case where the introduction port and the connected portion between the bypass passage and the surge tank are arranged at the same positions in the cylinder array direction, the moisture that is contained in the gas introduced from the bypass passage and is condensed possibly reaches the intercooler through the introduction port without reaching the reverse flow prevention structure.

On the contrary, according to the configuration, the connected portion between the bypass passage and the surge tank is offset from both of the introduction port and the reverse flow prevention structure. Accordingly, even in the case where the moisture that is contained in the gas introduced from the bypass passage is condensed in the surge tank, such condensed water is produced at the position that is offset from both of the introduction port and the reverse flow prevention structure in the cylinder array direction. As a result, the reverse flow prevention structure can catch the condensed water.

An exhaust passage through which burnt gas exhausted from the combustion chamber flows; and an EGR passage that connects the exhaust passage and the air intake passage and partially recirculates the burnt gas into the air intake passage may be provided. A downstream end of the EGR passage may be connected to a portion of the air intake passage on an upstream side of an upstream end of the bypass passage.

According to this configuration, EGR gas that contains the moisture flows through the bypass passage. Since it is configured that the EGR gas flows not only through the passage passing through the intercooler and the supercharger but also through the bypass passage, such a configuration can reduce an amount of the condensed water that is produced when the gas is cooled in the intercooler.

The reverse flow prevention structure may be constructed of a wall portion that rises from a bottom surface of the surge tank.

According to this configuration, the wall portion rises along the flow direction of the gas that flows into the surge tank from the introduction passage. Thus, the gas can smoothly flow along the wall portion. This can prevent such a situation where, as a result of collision of the gas against the wall portion, for example, the wall portion acts as an impactor and the condensed water is unintentionally produced.

Furthermore, according to the configuration, the reverse flow prevention structure can be configured without increasing intake air resistance. That is, it is possible to simultaneously prevent the reverse flow of the condensed water and suppress the intake air resistance.

Advantageous Effects of Invention

As it has been described so far, according to the air intake passage structure for the engine, the occurrence of the water hammer phenomenon resulted from condensed water can be suppressed while the engine can be configured to be compact.

DESCRIPTION OF EMBODIMENTS

Figure 1:
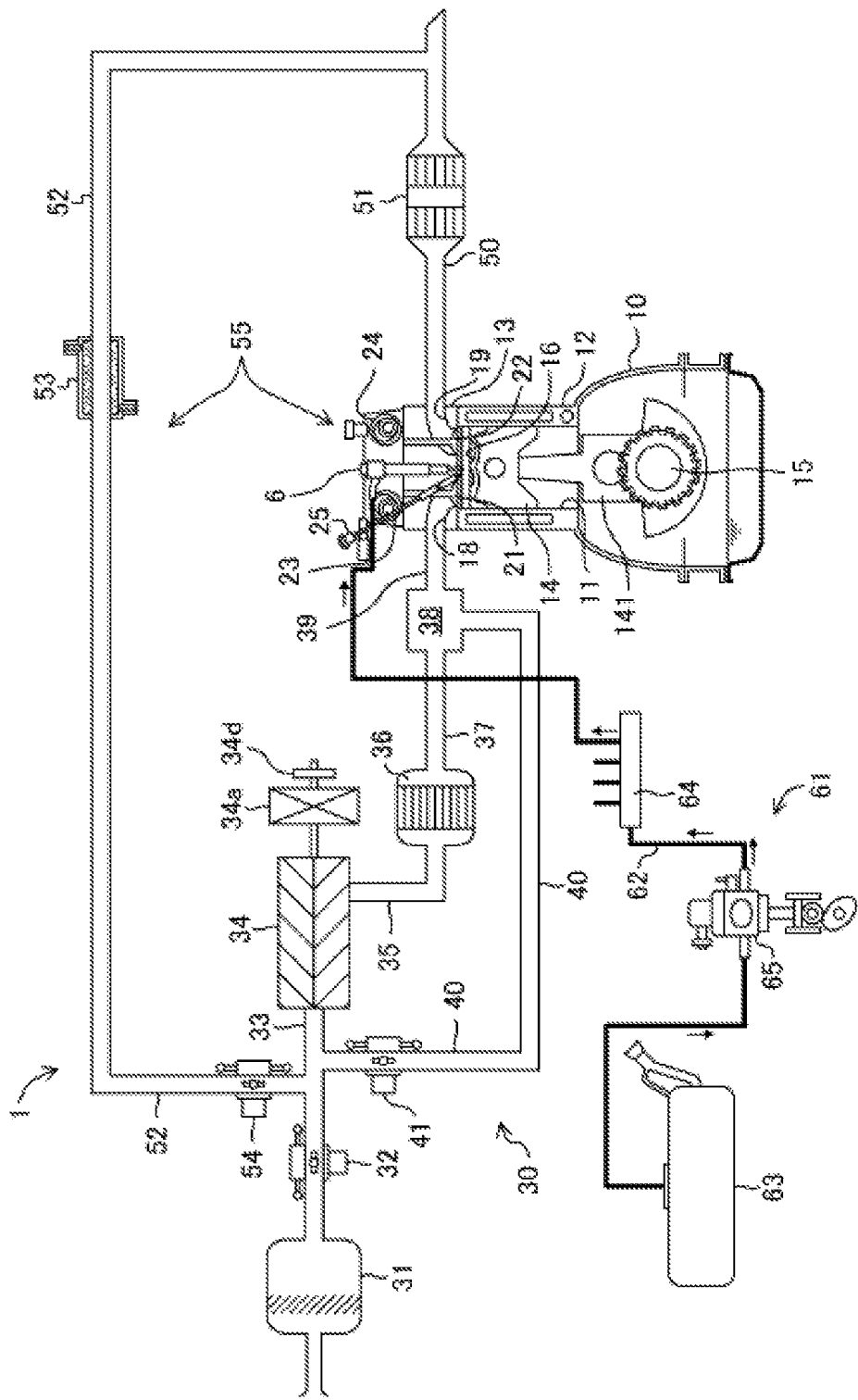
FIG. 1 is a schematic view for exemplifying a configuration of a multi-cylinder engine.
Figure 2:
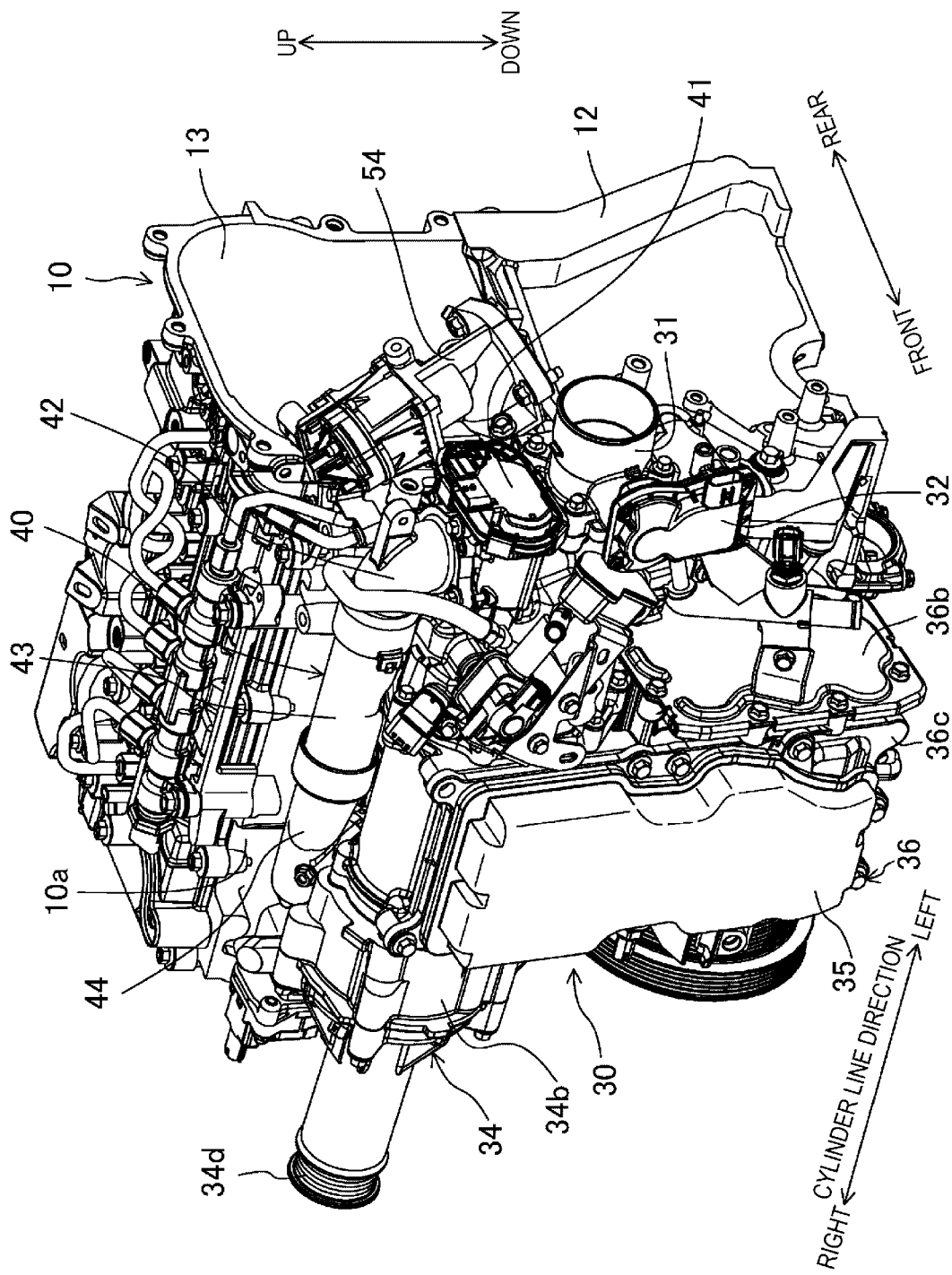
FIG. 2 is a perspective view of the configuration of the multi-cylinder engine in which some components are not illustrated.
Figure 3:
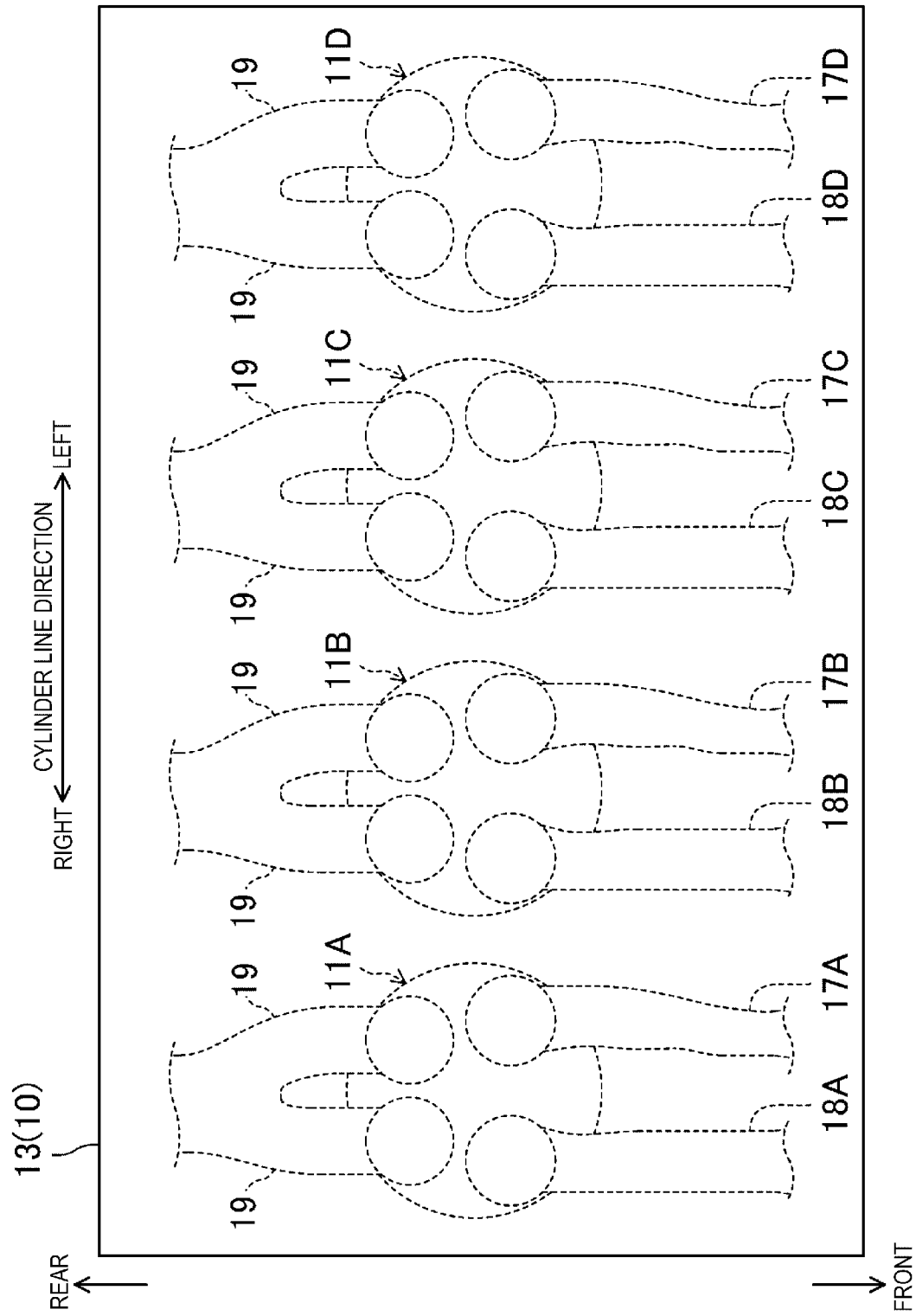
FIG. 3 is a plan view for schematically illustrating a configuration around four cylinders.

A detailed description will hereinafter be made on an embodiment of an air intake passage structure for an engine with reference to the drawings. Note that the following description is merely illustrative. FIG. 1 is a view for exemplifying an engine 1 to which the air intake passage structure for the engine disclosed herein is applied. FIG. 2 is a perspective view of a configuration of the engine 1 in which some components are not illustrated. FIG. 3 is a plan view for schematically illustrating a configuration around four cylinders 11.

The engine 1 is a gasoline engine (in particular, a four-stroke internal combustion engine) that is mounted on a vehicle with an FF layout, and, as illustrated in FIG. 1, is configured to include a mechanically-driven supercharger (a so-called supercharger) 34.

In addition, as illustrated in FIG. 3, the engine 1 according to this embodiment is configured as a so-called transversely-mounted, inline-four engine that includes the four cylinders (cylinders) 11 arranged in line and in which the four cylinders 11 are mounted in a posture of being aligned along a vehicle width direction. Accordingly, in this embodiment, an engine longitudinal direction as an arrangement direction of the four cylinders 11 (a cylinder array direction) substantially matches the vehicle width direction, and an engine width direction substantially matches a vehicle longitudinal direction.

Unless otherwise noted, a front side indicates one side in the engine width direction (a front side in the vehicle longitudinal direction), a rear side indicates the other side in the engine width direction (a rear side in the vehicle longitudinal direction), a left side indicates one side in the engine longitudinal direction (the cylinder array direction) (a left side in the vehicle width direction and an engine-front side), and a right side indicates the other side in the engine longitudinal direction (the cylinder array direction) (a right side in the vehicle width direction and an engine-rear side).

In addition, in the following description, an upper side indicates an upper side in a state where the engine 1 is mounted on the vehicle (hereinafter also referred to as a "vehicle-mounted state"), and a lower side indicates a lower side in the vehicle-mounted state.

(Schematic Configuration of Engine)

The engine 1 is configured as a front-intake, rear-exhaust type. More specifically, as illustrated in FIG. 3, the engine 1 includes: an engine body 10 having the four cylinders 11 (only one cylinder is illustrated in FIG. 1); an air intake passage 30 that is arranged on the front side of the engine body 10 and communicates with each of the cylinders 11 via intake ports 17, 18; and an exhaust passage 50 that is arranged on the rear side of the engine body 10 and communicates with each of the cylinders 11 via an exhaust port 19.

The air intake passage 30 according to this embodiment is configured as an "air intake system" in which plural passages for guiding gas, devices such as the supercharger 34 and an intercooler 36, and a bypass passage 40 bypassing these devices are combined as a unit.

The engine body 10 is configured to burn air-fuel mixture of the gas and fuel supplied from the air intake passage 30 in each of the cylinders 11 according to a specified combustion order. More specifically, the engine body 10 has a cylinder block 12 and a cylinder head 13 mounted thereon.

The four cylinders 11 are formed in the cylinder block 12. The four cylinders 11 are aligned in a manner to form a line along a center axis direction of a crankshaft 15 (that is, the cylinder array direction). Each of the four cylinders 11 is formed in a cylindrical shape, and a center axis of each of the cylinders 11 (hereinafter referred to as a "cylinder axis") extends in parallel with each other and perpendicularly to the cylinder array direction. Hereinafter, the four cylinders 11 illustrated in FIG. 3 may be referred to as a first cylinder 11A, a second cylinder 11B, a third cylinder 11C, and a fourth cylinder 11D in an order from the right side along the cylinder array direction.

A piston 14 is slidably inserted in each of the cylinders 11. The piston 14 is coupled to the crankshaft 15 via a connecting rod 141. With the cylinder 11 and the cylinder head 13, the piston 14 defines a combustion chamber 16.

A roof surface of the combustion chamber 16 has a so-called pent roof shape, and is constructed by a lower surface of the cylinder head 13. This engine 1 is configured that the roof surface of the combustion chamber 16 is positioned lower than a conventional roof surface for a purpose of increasing a geometrical compression ratio. The pent roof shape of the roof surface is almost a flat shape.

In the cylinder head 13, the two intake ports 17, 18 are formed for each of the cylinders 11. Each of the two intake ports 17, 18 communicates with the combustion chamber 16. Each of the cylinders 11 has a first port 17 and a second port 18 that is adjacent to said first port 17 in the cylinder array direction. In any of the first cylinder 11A to the fourth cylinder 11D, the first port 17 and the second port 18 are aligned in the same order. More specifically, as illustrated in FIG. 3, in each of the cylinders 11, the second port 18 and the first port 17 are aligned in an order from the right side along the cylinder array direction.

An upstream end of each of the ports 17, 18 is opened to an outer surface (an attachment surface) 10a of the engine body 10, and a downstream end of the air intake passage 30 is connected thereto. Meanwhile, a downstream end of each of the ports 17, 18 is opened to the roof surface of the combustion chamber 16.

Hereinafter, the first port that communicates with the first cylinder 11A may be denoted by a reference sign "17A" instead of "17", and the second port that communicates with said cylinder 11A may be denoted by a reference sign "18A" instead of "18". The same applies to the second cylinder 11B to the fourth cylinder 11D. For example, the second port that communicates with the third cylinder 11C may be denoted by a reference sign "18C" instead of "18".

In addition, for each of the cylinders 11, the two intake ports 17, 18 include a swirl control valve (SCV) port configured such that a flow rate of the flowing gas is restricted via an SCV 80. In this embodiment, the above-described second port 18 is configured as the SCV port.

An intake valve 21 is disposed in each of the two intake ports 17, 18. The intake valve 21 opens/closes a portion between the combustion chamber 16 and each of the intake ports 17, 18. The intake valve 21 opens/closes at specified timing by an intake valve mechanism.

In this configuration example, as illustrated in FIG. 1, the intake valve mechanism has an electric intake variable valve timing (VVT) 23 as a variable valve mechanism. The electric intake VVT 23 is configured to continuously change a rotation phase of an intake cam shaft within a specified angle range. In this way, valve opening timing and valve closing timing of the intake valve 21 are continuously changed. Note that the intake valve mechanism may have a hydraulic VVT instead of the electric VVT.

In the cylinder head 13, two exhaust ports 19, 19 are also formed for each of the cylinders 11. Each of the two exhaust ports 19, 19 communicates with the combustion chamber 16.

An exhaust valve 22 is disposed in each of the two exhaust ports 19, 19. The exhaust valve 22 opens/closes a portion between the combustion chamber 16 and each of the exhaust ports 19, 19. The exhaust valve 22 opens/closes at specified timing by an exhaust valve mechanism.

In this configuration example, as illustrated in FIG. 1, the exhaust valve mechanism has an electric exhaust variable valve timing (VVT) 24 as the variable valve mechanism. The electric exhaust VVT 24 is configured to continuously change a rotation phase of an exhaust cam shaft within a specified angle range. In this way, valve opening timing and valve closing timing of the exhaust valve 22 are continuously changed. Note that the exhaust valve mechanism may have the hydraulic VVT instead of the electric VVT.

Although a detailed description will not be made, in this engine 1, duration of an overlapping period relating to the valve opening timing of the intake valve 21 and the valve closing timing of the exhaust valve 22 is adjusted by the electric intake VVT 23 and the electric exhaust VVT 24. In this way, residual gas in the combustion chamber 16 is eliminated, and hot burnt gas is confined in the combustion chamber 16 (that is, internal exhaust gas recirculation (EGR) gas is introduced into the combustion chamber 16). In this configuration example, the electric intake VVT 23 and the electric exhaust VVT 24 constitute an internal EGR system. Note that the internal EGR system is not limited to be constructed of the VVTs.

In the cylinder head 13, an injector 6 is attached to each of the cylinders 11. In this configuration example, the injector 6 is a fuel injection valve of a multiple nozzle hole type, and is configured to directly inject the fuel into the combustion chamber 16.

A fuel supply system 61 is connected to the injector 6. The fuel supply system 61 includes: a fuel tank 63 configured to store the fuel; and a fuel supply passage 62 that couples the fuel tank 63 and the injector 6 to each other. A fuel pump 65 and a common rail 64 are provided in the fuel supply passage 62. The fuel pump 65 pressure-feeds the fuel to the common rail 64. In this configuration example, the fuel pump 65 is a plunger pump that is driven by the crankshaft 15. The common rail 64 is configured to store the fuel, which is pressure-fed from the fuel pump 65, at a high fuel pressure. When the injector 6 is opened, the fuel, which is stored in the common rail 64, is injected into the combustion chamber 16 from each of the nozzle holes of the injector 6.

In the cylinder head 13, an ignition plug 25 is attached to each of the cylinders 11. The ignition plug 25 is attached in such a posture that a tip thereof faces inside of the combustion chamber 16, and forcibly ignites the air-fuel mixture in the combustion chamber 16.

As illustrated in FIG. 2, the air intake passage 30 is connected to a side surface (hereinafter referred to as the "attachment surface") 10a on the front side of the engine body 10, and communicates with the intake ports 17, 18 of each of the cylinders 11. The air intake passage 30 is a passage through which the gas to be introduced into the combustion chamber 16 flows. An air cleaner 31 that filters fresh air is disposed in an upstream end portion of the air intake passage 30. A surge tank 38 is disposed near the downstream end of the air intake passage 30. As illustrated in FIG. 3, a portion of the air intake passage 30 on a downstream side of the surge tank 38 is branched into two for each of the cylinders 11 and thereby constitutes independent passages 39. Although a detailed description will be made later, one of the two independent passages 39 is connected to the first port 17, and the other is connected to the second port 18. Hereinafter, the former independent passage 39 may be denoted by a reference sign "391" while the latter may be denoted by a reference sign "392". Just as described, downstream ends of the independent passages 39 are respectively connected to the intake ports 17, 18 of each of the cylinders 11.

In the air intake passage 30, a throttle valve 32 is disposed between the air cleaner 31 and the surge tank 38. The throttle valve 32 is configured to adjust an opening amount thereof so as to adjust an amount of the fresh air to be introduced into the combustion chamber 16.

In addition, in the air intake passage 30, the supercharger 34 is disposed on a downstream side of the throttle valve 32. The supercharger 34 is configured to supercharge the gas to be introduced into the combustion chamber 16. In this configuration example, the supercharger 34 is a mechanical supercharger that is driven by the engine 1. Although the supercharger 34 according to this embodiment is configured as a Roots-type supercharger, the supercharger 34 can adopt any configuration. For example, the supercharger 34 may be of a Lysholm type or a centrifugal type.

An electromagnetic clutch 34a is interposed between the supercharger 34 and the engine 1. The electromagnetic clutch 34a transmits drive power from the engine 1 to the supercharger 34 or blocks the transmission of the drive power from the engine 1 to the supercharger 34. The supercharger 34 is switched between on and off when unillustrated control means such as an engine control unit (ECU) switches disengagement and engagement of the electromagnetic clutch 34a. That is, this engine 1 is configured to be switchable between operation for supercharging the gas to be introduced into the combustion chamber 16 and operation for not supercharging the gas to be introduced into the combustion chamber 16 by switching on and off of the supercharger 34.

The intercooler 36 is disposed on a downstream side of the supercharger 34 in the air intake passage 30. The intercooler 36 is configured to cool the gas that is compressed in the supercharger 34. The intercooler 36 in this configuration example is configured as a water-cooling type.

As a passage that connects the various devices incorporated in the air intake passage 30, the air intake passage 30 has: a first passage 33 that is disposed on a downstream side of the air cleaner 31 and through which intake air cleaned by the air cleaner 31 is guided to the supercharger 34; a second passage 35 through which the intake air compressed by the supercharger 34 is guided to the intercooler 36; and a third passage 37 through which the gas cooled by the intercooler 36 is guided to the surge tank 38. Note that, in order to shorten a channel length (a runner length) from the surge tank 38 to each of the intake ports 17, 18, the surge tank 38 is disposed near an inlet (an upstream end portion) of each of the intake ports 17, 18.

The air intake passage 30 is also provided with the bypass passage 40 that bypasses the supercharger 34 and the intercooler 36. The bypass passage 40 connects a portion of the air intake passage 30, which is from the downstream side of the throttle valve 32 to an upstream side of the supercharger 34, and the surge tank 38 to each other. In the bypass passage 40, a bypass valve 41 that is configured to adjust a flow rate of the gas flowing through said bypass passage 40 is disposed.

When the supercharger 34 is turned off (that is, when the electromagnetic clutch 34a is disengaged), the bypass valve 41 is fully opened. In this way, the gas flowing through the air intake passage 30 bypasses the supercharger 34, flows into the surge tank 38, and is introduced into the combustion chamber 16 via the independent passage 39. The engine 1 is operated in a non-supercharged, that is, naturally aspirated state.

When the supercharger 34 is turned on (that is, when the electromagnetic clutch 34a is engaged), an opening amount of the bypass valve 41 is appropriately adjusted. In this way, in the air intake passage 30, the gas that has flowed through the supercharger 34 partially flows through the bypass passage 40 and reversely flows to the upstream side of the supercharger 34. A reverse flow rate can be adjusted by adjusting the opening amount of the bypass valve 41. Thus, a boost pressure of the gas to be introduced into the combustion chamber 16 can be adjusted. In this configuration example, a supercharging system is constructed of the supercharger 34, the bypass passage 40, and the bypass valve 41.

The exhaust passage 50 is connected to a side surface on the rear side of the engine body 10, and communicates with the exhaust port 19 of each of the cylinders 11. The exhaust passage 50 is a passage through which exhaust gas exhausted from the combustion chamber 16 flows. Although detailed illustration is not provided, an upstream portion of the exhaust passage 50 constitutes an independent passage that is branched for each of the cylinders 11. An upstream end of the independent passage is connected to the exhaust port 19 of each of the cylinders 11. In the exhaust passage 50, an exhaust gas purification system having at least one catalytic converter 51 is disposed. The catalytic converter 51 is configured to include a three-way catalyst. Note that the exhaust gas purification system is not limited to the exhaust gas purification system that only includes the three-way catalyst.

An EGR passage 52 that constitutes an external EGR system is connected between the air intake passage 30 and the exhaust passage 50. The EGR passage 52 is a passage for partially recirculating the burnt gas to the air intake passage 30. An upstream end of the EGR passage 52 is connected to a downstream side of the catalytic converter 51 in the exhaust passage 50. A downstream end of the EGR passage 52 is connected to a portion of the air intake passage 30 on the upstream side of the supercharger 34 and an upstream side of an upstream end of the bypass passage 40.

In the EGR passage 52, a water-cooling EGR cooler 53 is disposed. The EGR cooler 53 is configured to cool the burnt gas. In the EGR passage 52, an EGR valve 54 is also disposed. The EGR valve 54 is configured to adjust a flow rate of the burnt gas flowing through the EGR passage 52. A recirculation amount of the cooled burnt gas, that is, external EGR gas can be adjusted by adjusting an opening amount of the EGR valve 54.

In this configuration example, an EGR system 55 is constructed of: the external EGR system configured to include the EGR passage 52 and the EGR valve 54; and the above-described internal EGR system configured to include the electric intake VVT 23 and the electric exhaust VVT 24.

(Configuration of Air Intake Passage)

A detailed description will hereinafter be made on a configuration of the air intake passage 30.

Figure 4:
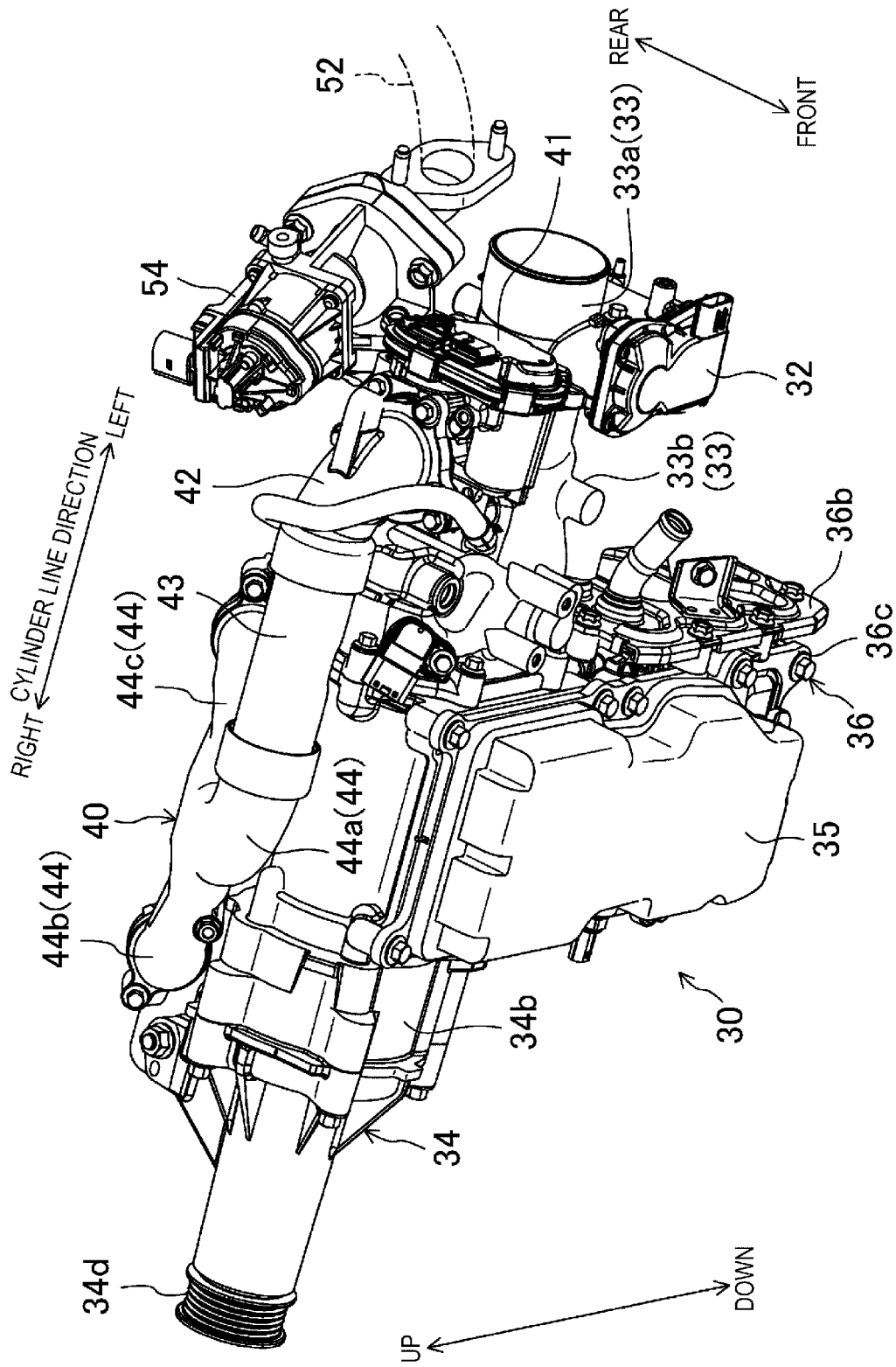
FIG. 4 is a perspective view of an overall configuration of an air intake system that is seen from the front.
Figure 5:
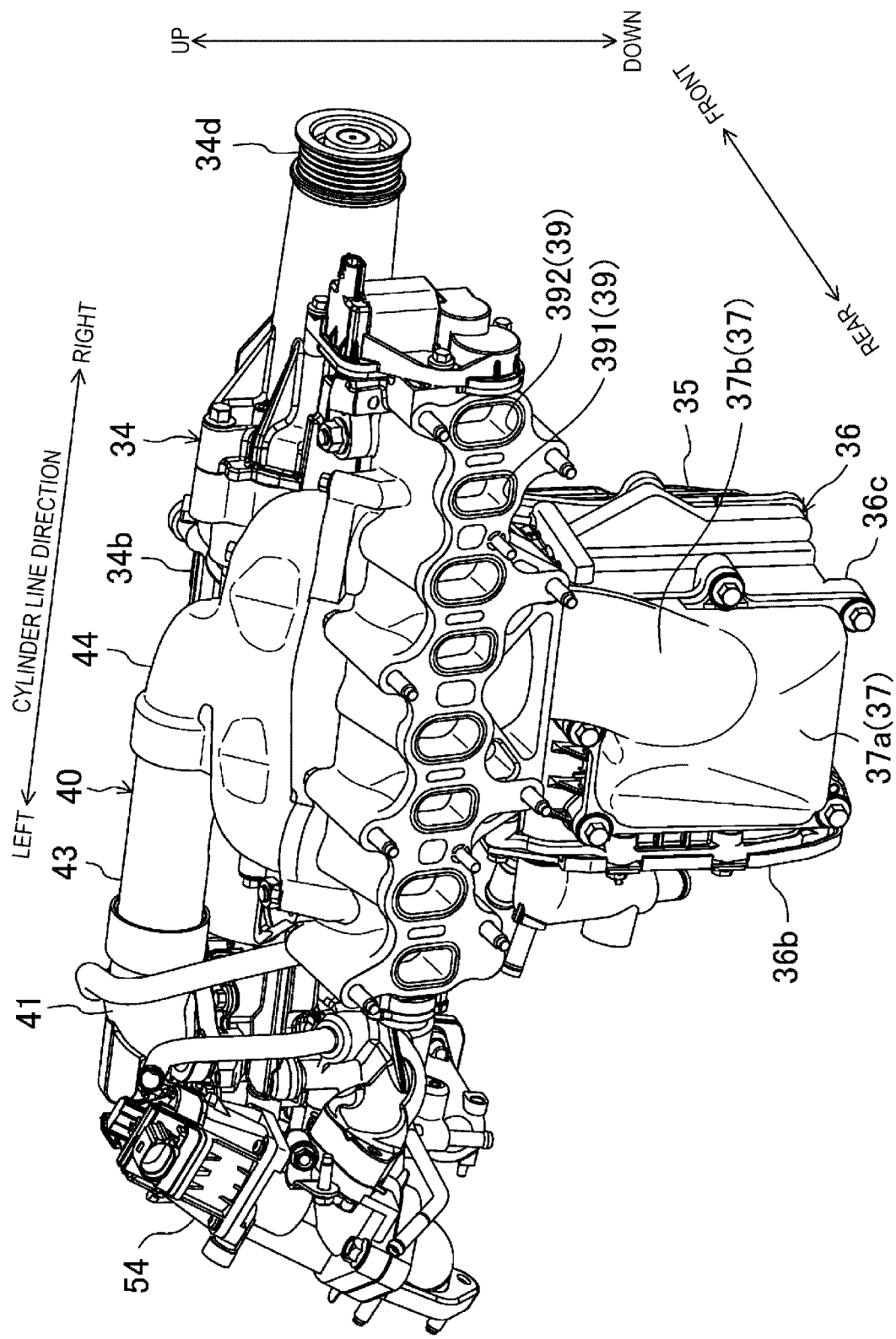
FIG. 5 is a perspective view of the overall configuration of the air intake system that is seen from the rear.
Figure 6:
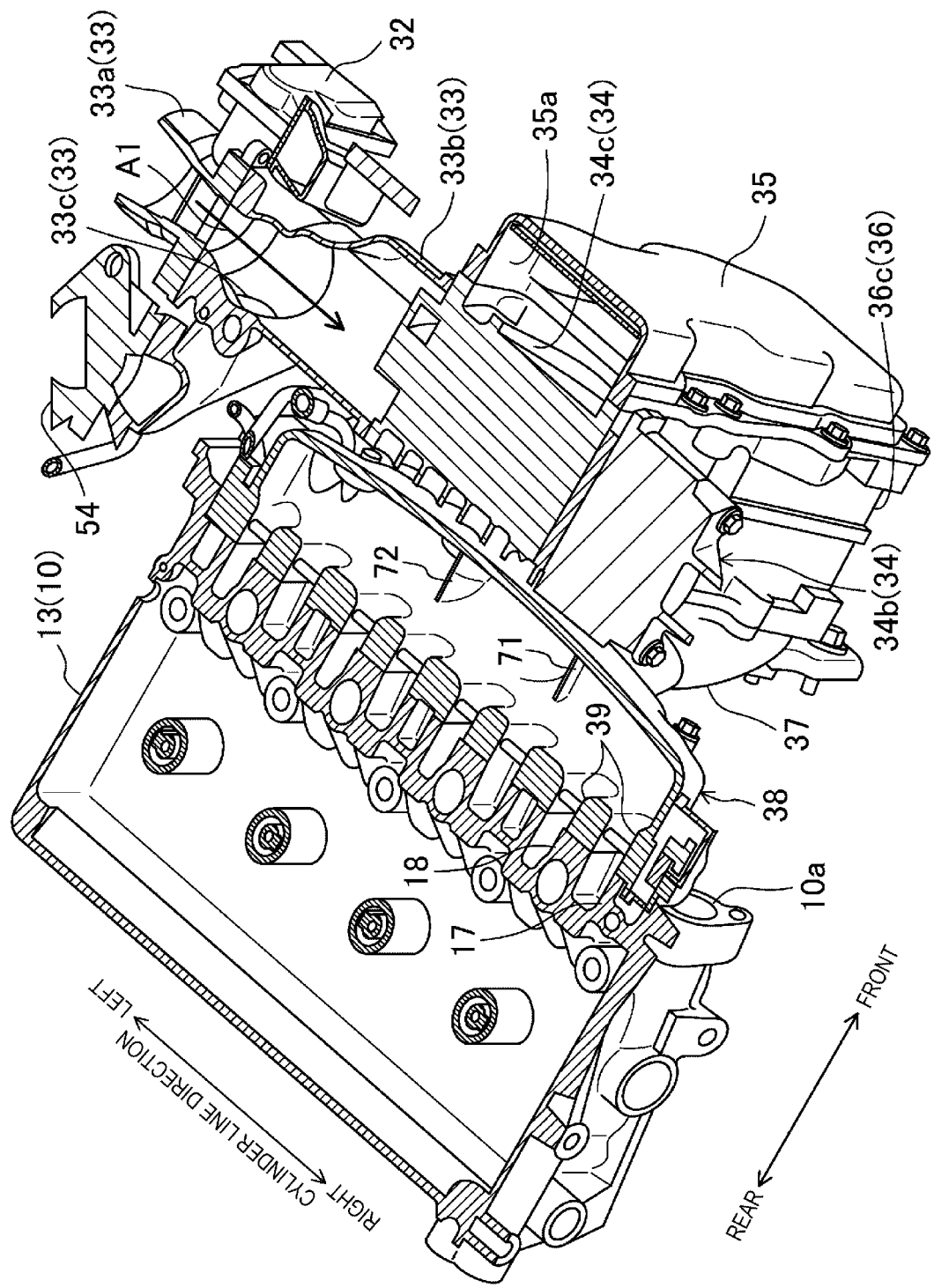
FIG. 6 is a transverse cross-sectional view of a passage structure on a supercharger side.
Figure 7:
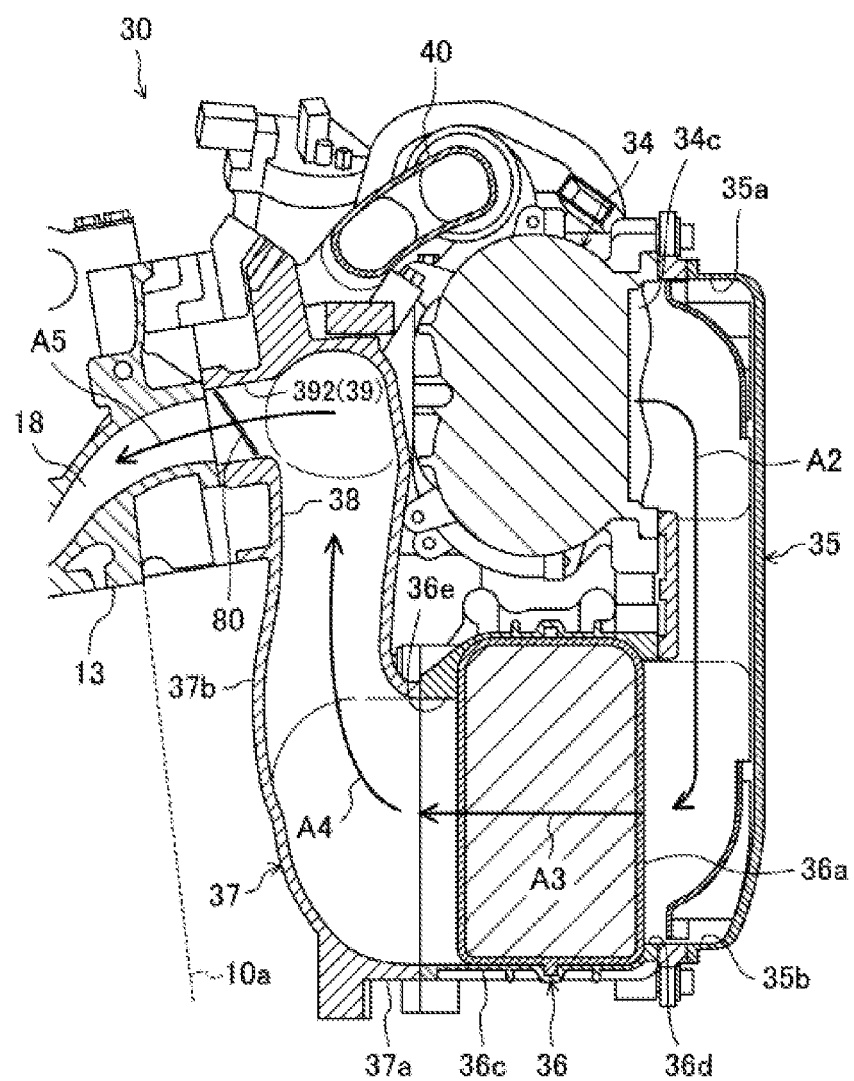
FIG. 7 is a vertical cross-sectional view of the passage structure on the supercharger side.
Figure 8:
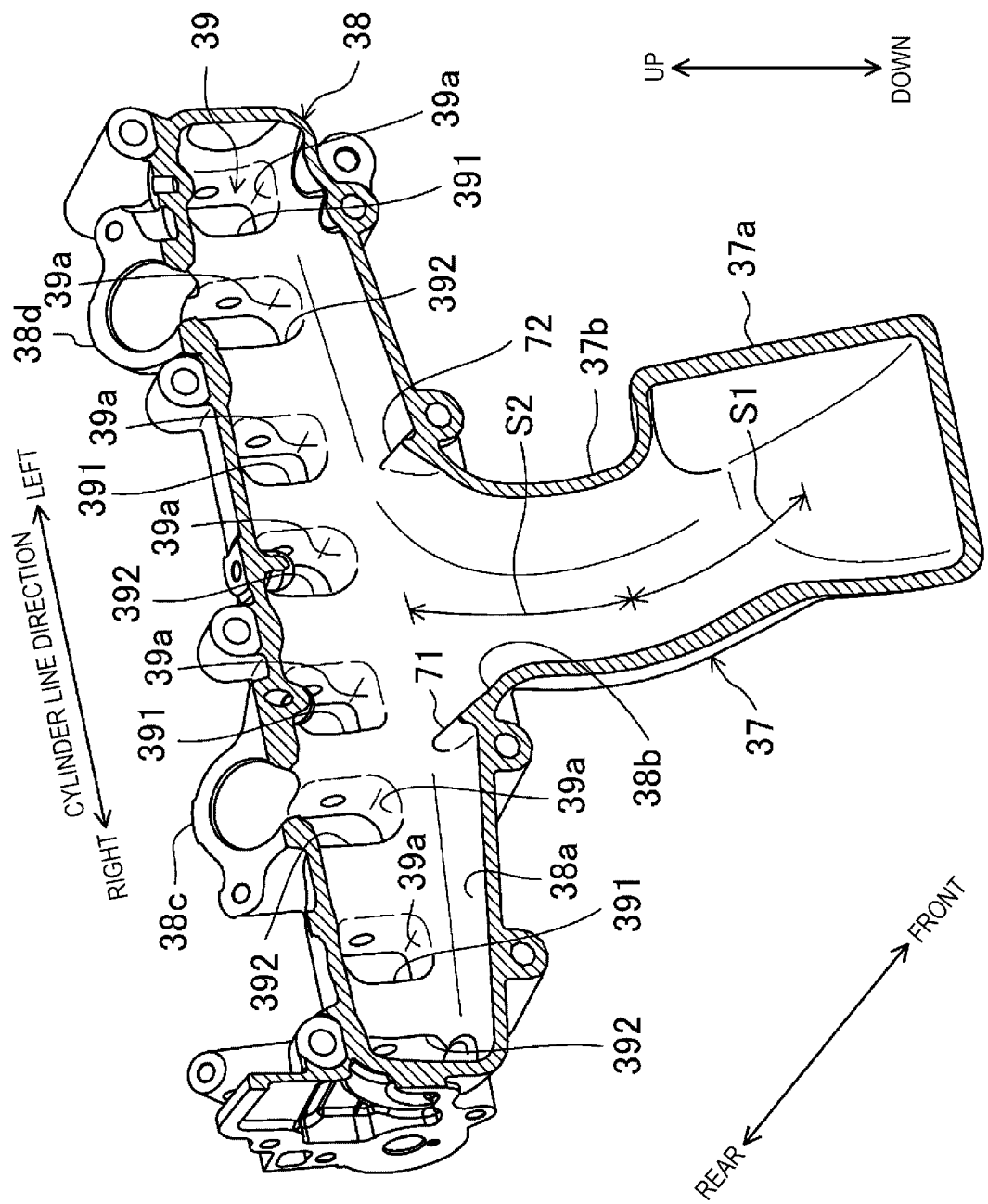
FIG. 8 is a perspective view of a vertical cross section of a portion around the surge tank.
Figure 9:
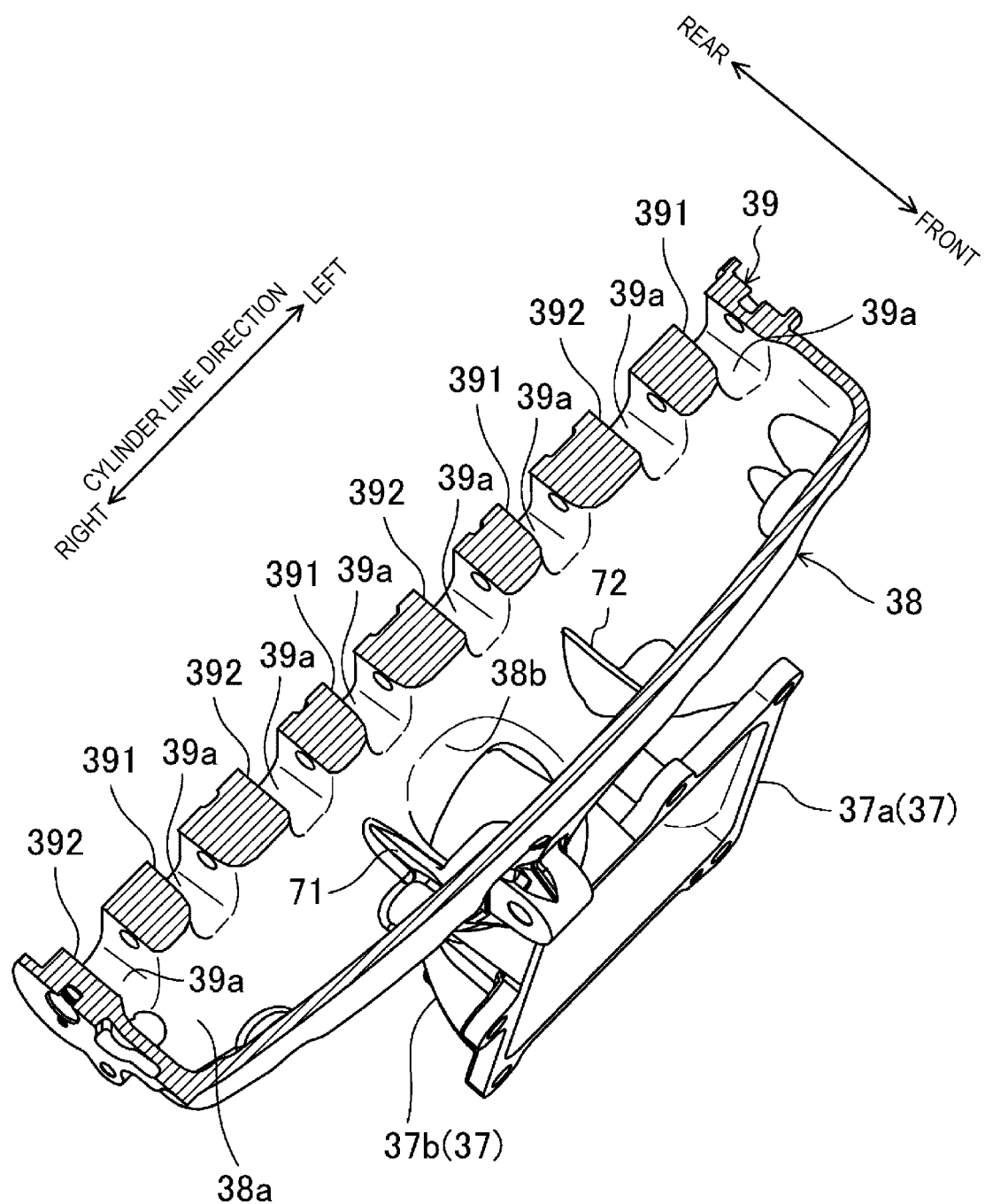
FIG. 9 is a perspective view for illustrating a different vertical cross section from FIG. 8.

FIG. 4 is a perspective view of the overall configuration of the air intake passage 30 that is unitized as the air intake system and is seen from the front. FIG. 5 is a perspective view of the overall configuration of the air intake passage 30 that is seen from the rear. FIG. 6 is a transverse cross-sectional view of a passage structure of the air intake passage 30 on the supercharger side, and FIG. 7 is a vertical cross-sectional view thereof. In addition, FIG. 8 is a perspective view of a vertical cross section of a portion around the surge tank 38, and FIG. 9 is a perspective view for illustrating a different vertical cross section therefrom.

Each portion that constitutes the air intake passage 30 is arranged on the front side of the engine body 10, more specifically, on the front side of the above-described attachment surface 10a. Note that, as illustrated in FIG. 6 to FIG. 7, the attachment surface 10a is constructed of outer surfaces on the front side of the cylinder head 13 and the cylinder block 12.

First, a description will be made on schematic arrangement of each of the portions constituting the air intake passage 30.

As illustrated in FIG. 2 and FIG. 4 to FIG. 8, the supercharger 34 is arranged on an opposite side of the four cylinders 11 from the surge tank 38 in a manner to oppose the four cylinders 11. A clearance (a space) that corresponds to dimensions of the surge tank 38 is provided between a rear surface of the supercharger 34 and the attachment surface 10a. On the left side of the supercharger 34, the first passage 33 extends along the cylinder array direction, and is connected to a left end of the supercharger 34. Meanwhile, the intercooler 36 is arranged below the supercharger 34, and, similar to the supercharger 34, is arranged with a specified space being provided between the intercooler 36 and the attachment surface 10a. The supercharger 34 and the intercooler 36 are vertically adjacent to each other. The second passage 35 extends vertically in a manner to connect a front portion of the supercharger 34 and a front portion of the intercooler 36. The surge tank 38 is arranged in the clearance between the supercharger 34 and the attachment surface 10a, and is arranged on an opposite side of cylinder-opposite-side ends (the inlets) of the intake ports 17, 18 from the plural independent passages 39 in a manner to oppose the opposite side of cylinder-opposite-side ends (the inlets) of the intake ports 17, 18. The third passage 37 extends in a manner to thread through the clearance between the attachment surface 10a and each of the intercooler 36 and the supercharger 34, and connects a rear portion of the intercooler 36 and a bottom portion of the surge tank 38 such that the intercooler 36 is positioned below the surge tank 38. The bypass passage 40 is formed to extend upward from an intermediate portion of the first passage 33 and thereafter extend toward the inside (to the right) of the engine body 10, and is connected to an upper portion of the surge tank 38. Note that the third passage 37 is an example of the "introduction passage".

Next, a description will be made on the structure of each of the portions constituting the air intake passage 30.

The first passage 33 is formed in a pipe shape that substantially extends in the cylinder array direction (a lateral direction), and an upstream (left) portion thereof is constructed of a throttle body 33a in which the throttle valve 32 is installed. The throttle body 33a is formed in a short cylindrical shape that is made of metal, and, as illustrated in FIG. 4 to FIG. 6, is arranged to be positioned on the left side and the front side of the attachment surface 10a while keeping such a posture that openings at both ends respectively face to the left and right. While the air cleaner 31 is connected to an upstream end (the left end) of the throttle body 33a via an unillustrated passage, a first passage body 33b as a downstream (right) portion of the first passage 33 is connected to a downstream end (the right end) of the throttle body 33a.

As illustrated in FIG. 6, the first passage body 33b is configured to connect the throttle body 33a to the supercharger 34. In detail, the first passage body 33b is configured to have a long cylindrical shape that is made of a resin and in which openings at both ends respectively face to the left and right. In front of the attachment surface 10a, the first passage body 33b is arranged in a coaxial manner with the throttle body 33*a*. Further, in detail, the first passage body 33*b* is formed such that a diameter thereof is gradually increased from the outside to the inside in the cylinder array direction (from the left side to the right side). The downstream end of the throttle body 33*a* is connected to the upstream end (the left end) of the first passage body 33*b* as described above while a suction port of the supercharger 34 is connected to the downstream end (the right end) thereof.

In addition, a merging portion 33*c* where the EGR passage 52 merges is opened in the first passage body 33*b*. As illustrated in FIG. 6, the merging portion 33*c* is formed on a rear surface of an upstream portion of the first passage body 33*b*, and the downstream end of the EGR passage 52 is connected thereto. The merging portion 33*c* is formed at least on the downstream side of the throttle valve 32.

Figure 10:
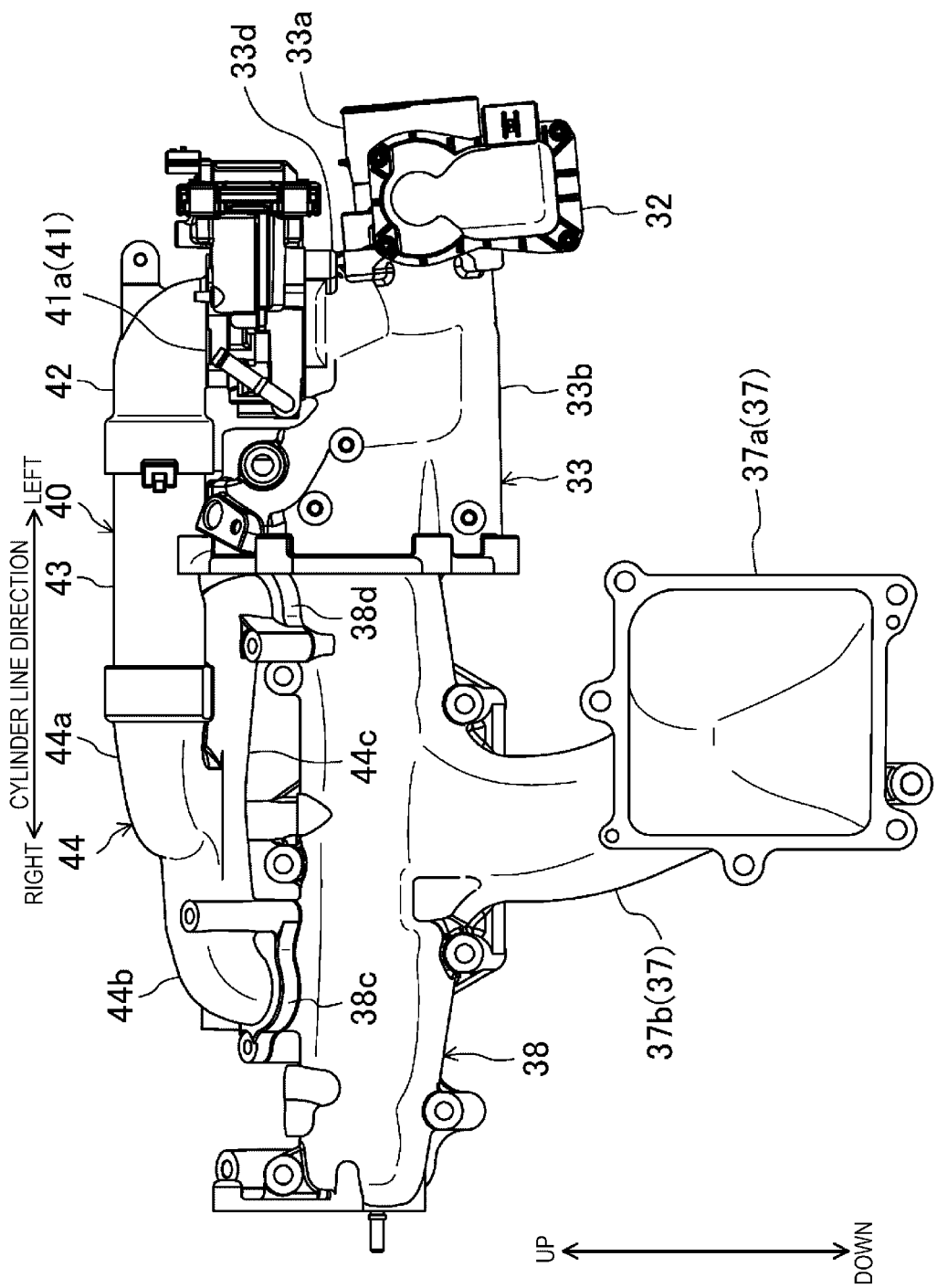
FIG. 10 is a view of the passage structure relating to a bypass passage that is seen from the front.

A branched portion 33*d* that is branched to the bypass passage 40 is also opened in the first passage body 33*b*. In the first passage body 33*b*, the branched portion 33*d* is formed on an upper surface near the merging portion 33*c* (at the substantially same position in a flow direction of the gas), and is connected to the upstream end of the bypass passage 40 (also see FIG. 10). As illustrated in FIG. 10 and the like, this branched portion 33*d* is positioned on an outer side (the left side) in the cylinder array direction of the supercharger 34, the intercooler 36, the four pairs of the intake ports 17, 18, and the surge tank 38, which is connected to each of the intake ports 17, 18 via the independent passage 39.

Accordingly, the fresh air, which has been cleaned by the air cleaner 31 and has flowed into the first passage 33, flows through the throttle valve 32, and is thereafter merged into the external EGR gas, which has flowed from the merging portion 33*c*. Then, during the natural aspiration, the gas, in which the fresh air and the external EGR gas are merged, flows into the bypass passage 40 via the branched portion 33*d*. Meanwhile, during the supercharging, such gas is suctioned into the supercharger 34 from the downstream end of the first passage body 33*b* while being merged into the gas that has flowed reversely through the bypass passage 40 (see an arrow A1 in FIG. 6).

A description will hereinafter be made on the passage structure on the supercharger 34 side and the passage structure on the bypass passage 40 side in this order.

—Passage Structure on Supercharger Side—

First, a detailed description will be made on the passage structure on the suction side of the supercharger 34.

As described above, the supercharger 34 according to this embodiment is configured as the Roots-type supercharger. In detail, the supercharger 34 is coupled to the crankshaft 15 via a pair of rotors (not illustrated) that is provided with a rotational shaft extending along the cylinder array direction, a casing 34*b* that accommodates the rotors, a drive pulley 34*d* that rotationally drives the rotors, and a drive belt (not illustrated) that is wound around the drive pulley 34*d*. The above-described electromagnetic clutch 34*a* is interposed between the drive pulley 34*d* and each of the rotors. By switching the electromagnetic clutch 34*a* between the disengagement and the engagement, the drive power is transmitted to the supercharger 34 via the crankshaft 15, or the transmission of the drive power is blocked.

The casing 34*b* is formed in a cylindrical shape that extends in the cylinder array direction, and defines an accommodating space for the rotors and a channel in which the gas flows through the supercharger 34. In detail, the casing 34*b* is formed in the cylindrical shape that is made of metal and in which a left end and a front surface are opened in a cylindrical direction. As illustrated in FIG. 6 and the like, the casing 34*b* is arranged to provide a specified space from a substantially central portion of the attachment surface 10*a* in the cylinder array direction and be coaxial with the first passage 33.

In a left end portion of the casing 34*b* in a longitudinal direction, a suction port from which the gas to be compressed by the rotors is opened, and the downstream end (the right end) of the first passage 33 is connected thereto. Meanwhile, as illustrated in FIG. 6 to FIG. 7, in a front portion (a side portion on the opposite side from the engine body 10) of the casing 34*b*, an outlet 34*c* from which the compressed gas by the rotors is discharged is opened, and an upstream end (an upper end) of the second passage 35 is connected thereto.

The drive pulley 34*d* is configured to rotationally drive the rotors that are accommodated in the casing 34*b*. In detail, the drive pulley 34*d* is formed in a shaft shape that is projected from a right end of the casing 34*b* and extends in a substantially coaxial manner with both of the first passage 33 and the casing 34*b*. The drive belt (not illustrated) is wound around a tip of the drive pulley 34*d*, and, as described above, the drive pulley 34*d* is configured to drive and couple the crankshaft 15 to the supercharger 34 according to a switched state of the electromagnetic clutch 34*a*.

As illustrated in FIG. 4, FIG. 6 to FIG. 7, and the like, the second passage 35 is configured to connect the supercharger 34 to the intercooler 36. In order to arrange the supercharger 34 and the intercooler 36 to be vertically adjacent to each other, the second passage 35 according to this embodiment is formed to extend along the vertical direction of the engine 1. In addition, as illustrated in FIG. 7, both of upper and lower ends of the second passage 35 are opened to the rear (the engine body 10 side). Here, an opening 35*a* on the upper side is connected to the front portion of the casing 34*b* (more specifically, the outlet 34*c*), and an opening 35*b* on the lower side is connected to the front portion of the intercooler 36 (a front surface of a cooler housing 36*c*).

In detail, the second passage 35 is formed as a square tube portion that is made of a resin, extends in the vertical direction, and is flat in the lateral direction, and both of vertical end portions are bent to the rear. That is, as illustrated in FIG. 7, the second passage 35 is configured to form a substantially U-shaped channel when seen in the cylinder array direction (in particular, when seen in the right direction).

As described above, the intercooler 36 according to this embodiment is configured as the water-cooling type and, as illustrated in FIG. 4 to FIG. 7, includes: a core 36*a* that has a gas cooling function; a core connected portion 36*b* that is attached to a side portion of the core 36*a*; and the cooler housing 36*c* that accommodates the core 36*a*. Although a detailed description will not be made, a water supply pipe, through which cooling water is supplied to the core 36*a*, and a water discharge pipe, through which the cooling water is discharged from the core 36*a*, are connected to the core connected portion 36*b*. Note that, as illustrated in FIG. 4 and the like, a dimension of the intercooler 36 in a width direction (the lateral direction) is smaller than a dimension of the supercharger 34 in a width direction and is substantially the same as a dimension of the second passage 35 in the same direction.

The core 36*a* is formed in a rectangular parallelepiped shape and is supported in such a posture that one side surface (a rear surface) thereof opposes the attachment surface 10*a*. While a front surface of the core 36*a* constitutes a gas inflow surface, the rear surface of the core 36*a* constitutes a gas outflow surface. Each of these surfaces is the largest surface in the core 36a. Although not shown, plural water tubes, each of which is provided by forming a thin plate material in a flat cylindrical shape, are aligned in the core 36a, and a wavelike corrugated fin is connected to an outer wall surface of each of the water tubes by brazing or the like. With such a configuration, the cooling water, which is supplied from the water supply pipe, is introduced into each of the water tubes so as to cool the high-temperature gas. The cooling water, which is heated by cooling the gas, is discharged from each of the water tubes via the water discharge pipe. In addition, a surface area of each of the water tubes is increased by providing the corrugated fin, which improves a heat radiation effect.

As illustrated in FIG. 4, the core connected portion 36b is a member in a thin rectangular plate shape, and is attached to a left surface of the core 36a. Each of the water supply pipe and the water discharge pipe is connected to the water tubes via the core connected portion 36b. The core connected portion 36b constitutes a left wall portion of the intercooler 36, and defines an accommodating space for the core 36a with the cooler housing 36c.

The cooler housing 36c is arranged below the casing 34b, defines the accommodating space for the core 36a, and constitutes a channel that is interposed between the second passage 35 and the third passage 37 of the air intake passage 30.

More specifically, the cooler housing 36c is formed in a thin rectangular box shape, a front surface and a rear surface of which are opened, and is supported in such a posture that the rear surface thereof opposes the attachment surface 10a at a position below the casing 34b. Similar to the casing 34b, this rear surface is arranged to provide the specified space (see FIG. 7) from the attachment surface 10a of the engine body 10.

In addition, while the downstream end of the second passage 35 is connected to an opening 36d on the front surface side of the cooler housing 36c, the upstream end of the third passage 37 is connected to an opening 36e on the rear surface side. A left surface of the cooler housing 36c is also opened. The opening is configured as an insertion opening that is used when the core 36a is accommodated in the cooler housing 36c, and is closed by the core connected portion 36b.

The third passage 37 is a resin member that is integrally molded with the surge tank 38 and the independent passages 39, and, as illustrated in FIG. 7 and FIG. 8, is configured to connect the intercooler 36 to the surge tank 38. In detail, the third passage 37 sequentially has, from the upstream side: a collection portion 37a that is fastened to the cooler housing 36c and where the gas that has flowed through the intercooler 36 is collected; and an introduction portion 37b where the collected gas in the collection portion 37a is guided to the surge tank 38. At least in the vehicle-mounted state, the third passage 37 is disposed below the surge tank 38.

The collection portion 37a is formed in a box shape, a front surface side, that is, the cooler housing 36c side of which is opened, and which is longitudinally short. As illustrated in FIG. 7, an opened portion thereof is connected to the opening 36e on the rear surface side of the cooler housing 36c. The collection portion 37a is positioned in the clearance between the rear surface of the cooler housing 36c and the attachment surface 10a of the engine body 10. In addition, an upstream end of the introduction portion 37b is further connected to a rear surface of the collection portion 37a.

The introduction portion 37b is formed as a bent pipe portion that extends in the substantially vertical direction. While the upstream end thereof is connected to the rear surface of the collection portion 37a, a downstream end thereof is connected to a central portion of a surge tank bottom surface (see FIG. 8 to FIG. 9). As illustrated in FIG. 7 and the like, this introduction portion 37b extends in a manner to thread through the clearance between a region from the rear surface of the collection portion 37a to a rear surface of the casing 34b in the supercharger 34 and the attachment surface 10a of the engine body 10.

Further in detail, as illustrated in FIG. 8, the introduction portion 37b is formed such that, while an upstream portion thereof extends obliquely upward to the right from a connected portion to the collection portion 37a, a downstream portion thereof extends vertically upward toward a connected portion to the surge tank 38. As a result of such formation, when seen from the side in the cylinder array direction, a downstream end portion of the introduction portion 37b extends in a substantially orthogonal direction to the flow direction of the gas in the independent passage 39 (see FIG. 7).

The surge tank 38 is formed in a substantially cylindrical shape which extends from positions, at which the intake ports 17, 18 (more specifically, a second port 18A) corresponding to the first cylinder 11A are disposed, to positions, at which the intake ports 17, 18 (more specifically, a first port 17D) corresponding to the fourth cylinder 11D are disposed, in the cylinder array direction, and both ends of which in the same direction are closed.

As described above, the surge tank 38 is arranged on the opposite side of the cylinder-opposite-side ends of the intake ports 17, 18 from the independent passages 39 in the manner to oppose the cylinder-opposite-side ends of the intake ports 17, 18 (see FIG. 7). As will be described later, in the case where each of the plural independent passages 39 is formed in a short cylindrical shape, due to such arrangement, the surge tank 38 is positioned near the inlet (the upstream end portion) of each of the intake ports 17, 18. This is advantageous for reducing the channel length (the runner length) from the surge tank 38 to each of the intake ports 17, 18.

In addition, as illustrated in FIG. 9, the downstream end of the third passage 37 (the introduction portion 37b) is connected to the bottom portion of the surge tank 38. An introduction port 38b that has a substantially circular cross section is opened in a central portion (more specifically, a central portion in the cylinder array direction) of an inner bottom surface 38a of the surge tank 38, and the downstream end portion of the introduction portion 37b is connected to the surge tank 38 via this introduction port 38b.

Note that the introduction port 38b is formed to have a larger diameter than the intake ports 17, 18.

In addition, in the surge tank 38, a dimension from the introduction port 38b to one end in the cylinder array direction (an end on the first cylinder 11A side) is substantially equal to a dimension therefrom to the other end (an end on the fourth cylinder 11D side). With such a configuration, it is possible to secure intake air distribution performance, which is further advantageous for reducing a difference in charging efficiency among the cylinders.

Furthermore, as illustrated in FIG. 9, upstream end portions of the plural independent passages 39 are aligned in line according to the alignment order of the corresponding intake ports 17, 18, and are connected to the surge tank 38.

More specifically, on the side surface (the rear surface) on the engine body 10 side of the surge tank 38, four pairs (that is, the total of eight) of the independent passages 39, two each of which are paired, are formed in a state of being aligned along the cylinder array direction. Each of the eight independent passages 39 is formed as a passage in a short cylindrical shape that extends substantially straight to the rear in the vehicle-mounted state. While one end side (the upstream side) thereof communicates with a space in the surge tank 38, the other end side (the downstream side) thereof is opened to the engine body 10 side (the rear side).

The four pairs of the independent passages 39 are disposed so as to respectively correspond to the four pairs of the intake ports 17, 18. Each of the independent passages 39 and the corresponding pair of the intake ports 17, 18 constitute a single passage when the third passage 37, the surge tank 38, and the independent passages 39, which are integrally formed, are assembled to the engine body 10.

As described above, each unit of the independent passages 39 includes an independent passage 391 corresponding to the first port 17 and an independent passage 392 corresponding to the second port 18. In the case where the third passage 37, the surge tank 38, and the independent passages 39 are assembled to the cylinder block 12, the first port 17 and the corresponding independent passage 391 constitute a single independent passage while the second port 18 and the corresponding independent passage 392 constitute a single independent passage. Just as described, the eight independent passages are constructed.

Figure 11:
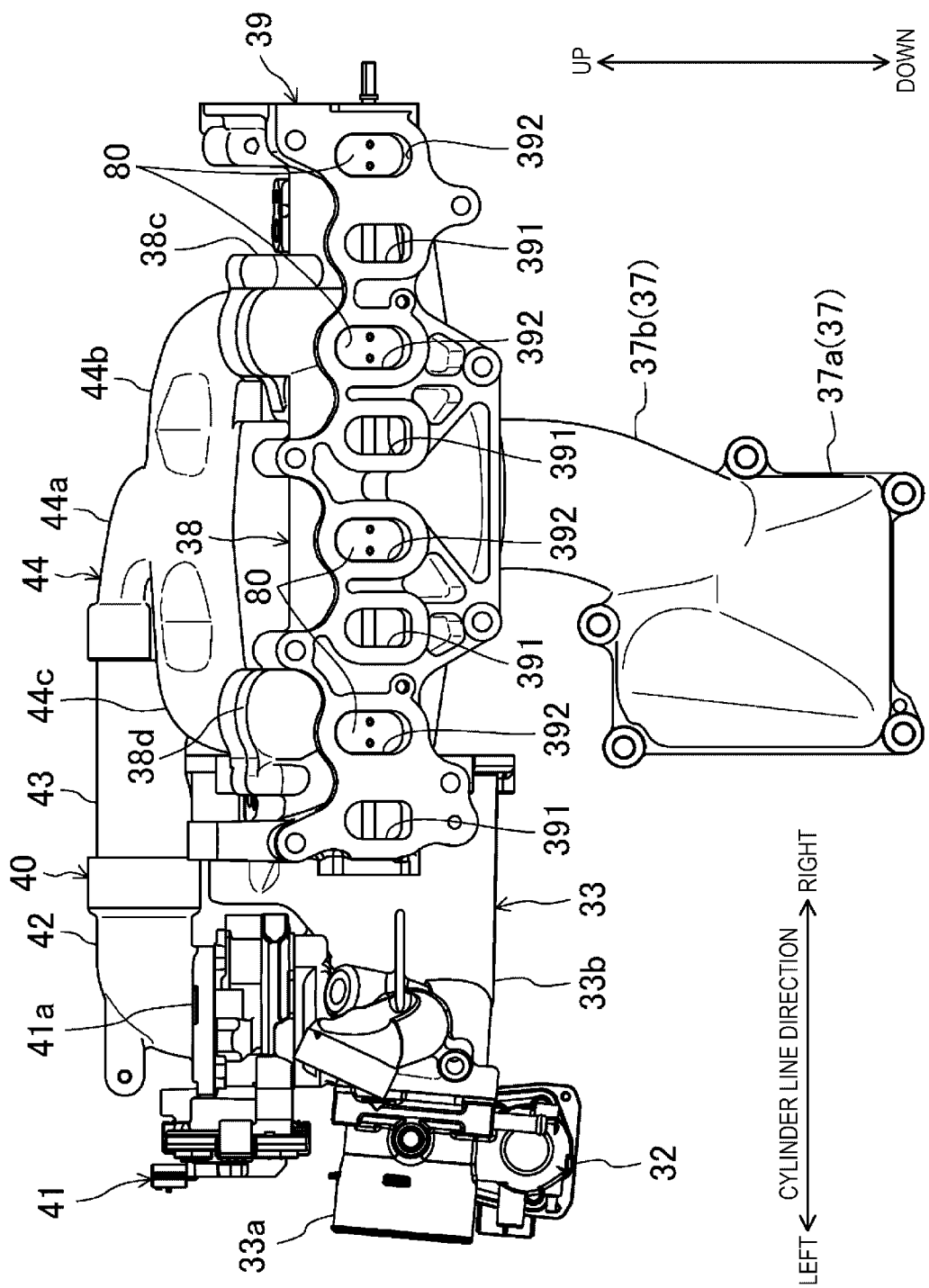
FIG. 11 is a view of the passage structure relating to the bypass passage that is seen from the rear.

The above-described SCV 80 is disposed in the independent passage 392, which is connected to the second port 18 (see FIG. 7, FIG. 11, and the like). Since the flow rate of the gas flowing through this second port 18 is reduced by reducing the opening amount of the SCV 80, the flow rate of the gas flowing through the other first port 17 can relatively be increased.

By the way, as will be described later, a downstream portion of the bypass passage 40 is branched into two, and a downstream end portion of each of the branched passages (hereinafter referred to as "branched passages" 44b, 44c) is connected to an upper surface of the surge tank 38.

In order to obtain such a structure, the upper surface of the surge tank 38 is provided with two first and second introduction portions 38c, 38d that are arranged with a space being interposed therebetween in the cylinder array direction and are configured to communicate between the inside and the outside of the surge tank 38.

Both of the two first and second introduction portions 38c, 38d are set at offset positions from the introduction port 38b of the surge tank 38 in the cylinder array direction. In regard to the two first and second introduction portions 38c, 38d, while the downstream end portion of the one branched passage (hereinafter also referred to as a "first branched passage") 44b is connected to the first introduction portion 38c, which is positioned on one side (the right side) in the cylinder array direction, the downstream end portion of the other branched passage (hereinafter also referred to as a "second branched passage") 44c is connected to the second introduction portion 38d, which is positioned on the other side (the left side) (also see FIG. 12).

More specifically, both of the first and second introduction portions 38c, 38d are formed in short cylindrical shapes and, as illustrated in FIG. 8, extend perpendicularly to the cylinder array direction from the upper surface of the surge tank 38 and obliquely upward to the front.

As illustrated in FIG. 8, in the cylinder array direction, the first introduction portion 38c is disposed to oppose a section from an upstream end portion of the independent passage 392, which corresponds to the second port 18A of the first cylinder 11A, to an upstream end portion of the independent passage 391, which corresponds to a first port 17B of the second cylinder 11B, more specifically, a section from the upstream end portion of the independent passage 391, which corresponds to a first port 17A of the first cylinder 11A, to the upstream end portion of the independent passage 392, which corresponds to a second port 18B of the second cylinder 11B, further more specifically, a portion near the upstream end portion of the independent passage 392, which corresponds to the second port 18B of the second cylinder 11B.

Meanwhile, as illustrated in FIG. 8, in the cylinder array direction, the second introduction portion 38d is disposed to oppose a section from the upstream end portion of the independent passage 392, which relates to a second port 18C of the third cylinder 11C, to the upstream end portion of the independent passage 391, which relates to the first port 17D of the fourth cylinder 11D, more specifically, a section from the upstream end portion of the independent passage 391, which relates to a first port 17C of the third cylinder 11C, to the upstream end portion of the independent passage 392, which relates to a second port 18D of the fourth cylinder 11D, further more specifically, a portion near the upstream end portion of the independent passage 392, which relates to the second port 18D of the fourth cylinder 11D.

That is, in the cylinder array direction, the second introduction portion 38d is offset to the left side from the first introduction portion 38c, that is, in a direction from the first cylinder 11A toward the fourth cylinder 11D. As a result of such offsetting, in the cylinder array direction, the second introduction portion 38d and the independent passages 391, 392, which correspond to the fourth cylinder 11D, are close to each other in comparison with the first introduction portion 38c and the independent passages 391, 392, which correspond to the first cylinder 11A.

In addition, as illustrated in FIG. 8 to FIG. 9, the inner bottom surface 38a of the surge tank 38 is formed to be positioned lower than a lower surface 39a at the upstream end of each of the eight independent passages 39 in the vehicle-mounted state. Furthermore, the each inner bottom surface 38a is formed to be positioned higher when separating from the introduction port 38b in the cylinder array direction than the inner bottom surfaces 38a when approaching the introduction port 38b.

Figure 14:
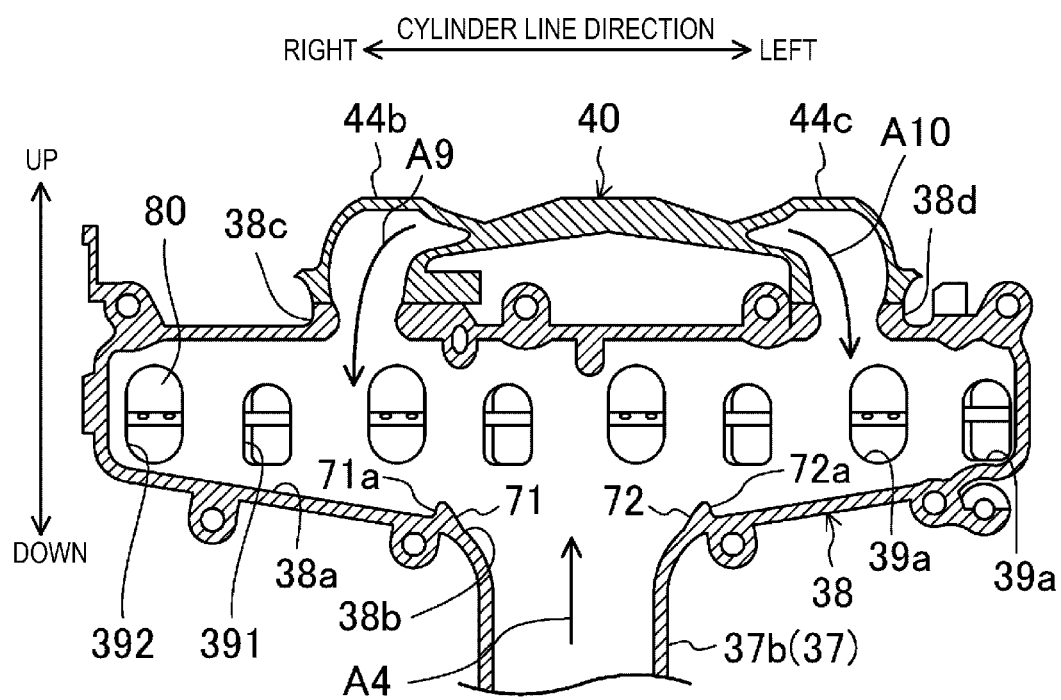
FIG. 14 is a vertical cross-sectional view of a connection structure of the surge tank and the bypass passage.

That is, the inner bottom surface 38a is configured that the height thereof approximates a height of the lower surface 39a at the upstream end of each of the independent passages 39 as separating from the introduction port 38b, which serves as a connected portion to a downstream end portion of the third passage 37, in the cylinder array direction (also see FIG. 14).

More specifically, the inner bottom surface 38a of the surge tank 38 is inclined to gradually become higher as separating from the introduction port 38b. Thus, portions of this inner bottom surface 38a near the first cylinder 11A and the fourth cylinder 11D on both end sides are higher than a portion thereof near the second cylinder 11B and the third cylinder 11C on a center side.

As illustrated in FIG. 8 to FIG. 9, a wall portion 71, 72 is vertically provided on both sides of the introduction port 38b (both of the left and right sides in the cylinder array direction). At an edge of the introduction port 38b, which is formed as the connected portion of the surge tank 38 to the third passage 37, each of the wall portions 71, 72 is vertically provided in a manner to rise from the inner bottom surface 38a of the surge tank 38 along the flow direction of the gas. Dimensions of the wall portions 71, 72 in a height direction are the same.

The gas that is suctioned into the supercharger 34 reaches each of the cylinders 11 via the "supercharging passages" configured as described above.

That is, when the engine 1 is operated, the output from the crankshaft 15 is transmitted via the drive belt and the drive pulley 34d to cause rotation of the rotors during the supercharging. Due to the rotation of the rotors, the supercharger 34 compresses the gas, which is suctioned from the first passage 33, and discharges the compressed gas from the outlet 34c. The discharged gas then flows into the second passage 35, which is arranged in front of the casing 34b.

As indicated by an arrow A2 in FIG. 7, the gas that is discharged from the supercharger 34 and flows into the second passage 35 flows forward from the outlet 34c of the supercharger 34 and then flows downward along the second passage 35. The gas that flows downward reaches a lower portion of the second passage 35 and then flows rearward to the intercooler 36.

Next, as indicated by an arrow A3 in FIG. 7, the gas that flows through the second passage 35 flows into the cooler housing 36c from the opening 36d on the front surface side and flows rearward from the front side. The gas that flows into the cooler housing 36c is cooled by the cooling water, which is supplied to the water tubes, when flowing through the core 36a. The cooled gas flows out of the opening 36e on the rear surface side of the cooler housing 36c and flows into the third passage 37.

Then, as indicated by an arrow A4 in FIG. 7, the gas that flows into the third passage 37 from the intercooler 36 flows through the collection portion 37a, then flows obliquely upward to the right along the upstream portion of the introduction portion 37b (also see a section S1 in FIG. 8), and thereafter flows vertically upward along the downstream portion of the introduction portion 37b (also see a section S2 in FIG. 8). As indicated by an arrow A5 in the same drawing, the gas that flows through the introduction portion 37b flows into the substantially central space of the surge tank 38 in the cylinder array direction, is temporarily stored in the surge tank 38, and is then supplied to each of the cylinders 11 via the independent passages 39.

—Passage Structure on Bypass Side—

Next, a detailed description will be made on a configuration on the bypass passage 40 side.

Figure 12:
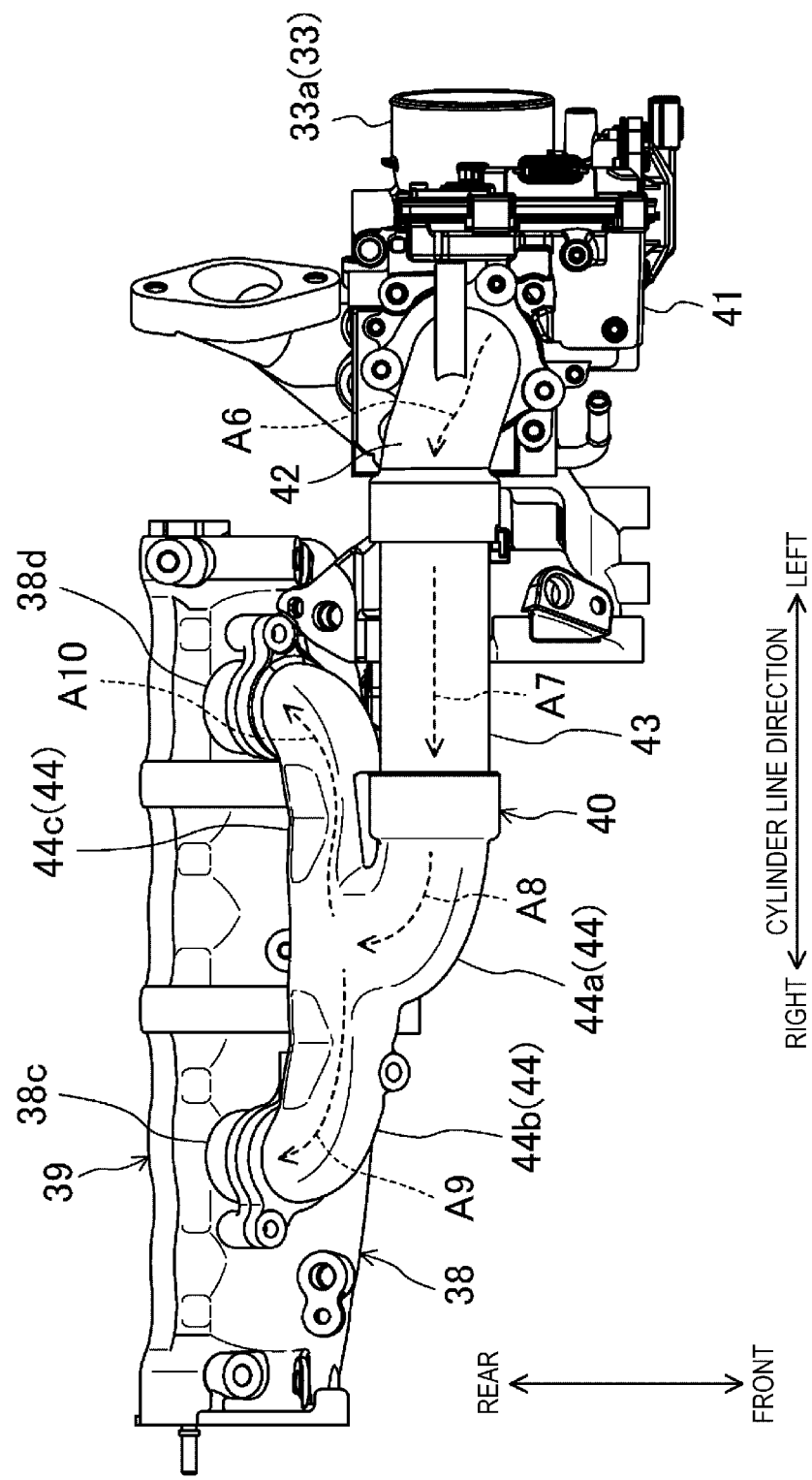
FIG. 12 is a view of the passage structure relating to the bypass passage that is seen from above.
Figure 13:
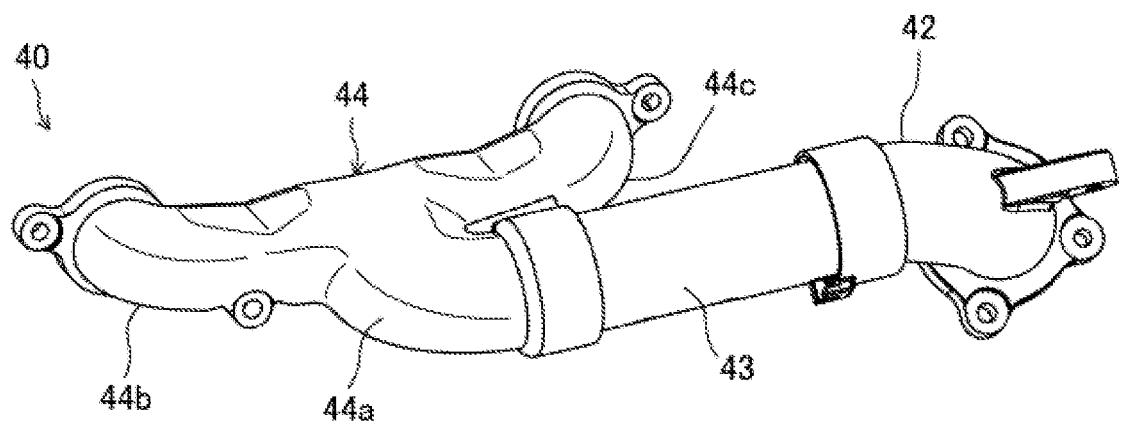
FIG. 13 is a perspective view of a pipeline of the bypass passage.

FIG. 10 is a view of a passage structure relating to the bypass passage 40 that is seen from the front, FIG. 11 is a view thereof that is seen from the rear, and FIG. 12 is a view thereof that is seen from above. FIG. 13 is a perspective view of a pipeline of the bypass passage 40.

The bypass passage 40 extends upward from the branched portion 33d of the first passage 33 and then extends substantially linearly to the right. When a portion of the bypass passage 40 that extends rightward reaches near the center (more specifically, the center in the cylinder array direction) of the surge tank 38, the bypass passage 40 changes the direction so as to extend obliquely downward to the rear, and is then branched into two. Each of the branched portions is connected to the upper surface of the surge tank 38.

More specifically, the bypass passage 40 is constructed of, from the upstream side along the flow direction: a valve body 41a in which the bypass valve 41 is installed; a bent pipe portion 42 for adjusting the flow direction of the gas, which has flowed through the valve body 41a; a straight pipe portion 43 for guiding the gas, which has flowed through the bent pipe portion 42, to the right; and a branched pipe portion 44 for guiding the gas, which has flowed through the straight pipe portion 43, obliquely downward to the rear, and then being branched into two and connected to the surge tank 38.

The valve body 41a is formed in a short cylindrical shape that is made of metal, and, as illustrated in FIG. 10 to FIG. 11, is arranged at a position above the first passage 33 and on the left side of the supercharger 34 while keeping such a posture that openings at both ends face to the above and below. In addition, similar to the first passage 33, the valve body 41a is positioned in front of a portion near a left end of the attachment surface 10a. While the branched portion 33d of the first passage 33 is connected to an upstream end (a lower end) of the valve body 41a, an upstream end of the bent pipe portion 42 is connected to a downstream end (an upper end) of the valve body 41a.

The bent pipe portion 42 is made of a resin, is configured as a pipe joint in an elbow shape, and is arranged at a position above the first passage 33 and the valve body 41a while keeping such a posture that openings thereof face to the below and right. Accordingly, the gas that flows into the bent pipe portion 42 flows in a perpendicular direction to a main stream of the gas in the first passage (vertically upward). Thereafter, the flow direction thereof is changed according to a bent direction of the bent pipe portion 42. As a result, when seen in a cylinder axis direction (see FIG. 12), the gas that flows through the bent pipe portion 42 flows inward from the outer side in the cylinder array direction (rightward from the left side) while flowing slightly rearward. In addition, similar to the first passage 33 and the valve body 41a, the bent pipe portion 42 is positioned in front of the portion near the left end of the attachment surface 10a. As described above, while the downstream end (the upper end) of the valve body 41a is connected to the upstream end (a lower end) of the bent pipe portion 42, an upstream end of the straight pipe portion 43 is connected to a downstream end (a right end) of the bent pipe portion 42.

The straight pipe portion 43 is formed in a long cylindrical shape that is made of the resin (more specifically, a cylindrical shape that extends in the direction from the one side (the left side) in the cylinder array direction to the other side (the right side)). Referring back to FIG. 4 to FIG. 5, the straight pipe portion 43 is arranged at a position above the first passage 33 to the supercharger 34 while keeping such a posture that openings at both ends face to the left and right. As described above, while the downstream end (the right end) of the bent pipe portion 42 is connected to the upstream end (a left end) of the straight pipe portion 43, an upstream end of the branched pipe portion 44 is connected to a downstream end (a right end) of the straight pipe portion 43.

The branched pipe portion 44 is constructed of: a bent passage 44a that is bent in the elbow shape; and the two branched passages 44b, 44c that are branched from a downstream end of the bent passage 44a in the form of a single-elimination tournament. The branched pipe portion 44 is arranged at a position above the supercharger 34 to the surge tank 38 while keeping such a posture that an upstream end of the bent passage 44a faces to the left and both of the two branched passages 44b, 44c, which are branched, face to obliquely downward to the rear.

In detail, the bent passage 44a is bent substantially at a right angle so as to extend obliquely downward to the rear from the front side as extending rightward from the left side. As illustrated in FIG. 12, when seen in the cylinder axis direction, a rear end portion of this bent passage 44a is branched in a substantially T-shape into the two branched passages 44b, 44c.

Channel lengths of the two branched passages 44*b*, 44*c* are substantially the same, and the first branched passage 44*b* as the one branched passage, which is branched, extends rightward along the cylinder array direction from a branched portion, and is then bent in a manner to extend obliquely downward to the rear. Meanwhile, the second branched passage 44*c* as the other branched passage, which is branched, extends leftward along the cylinder array direction from the branched portion, and is then bent in a manner to extend obliquely downward to the rear. As described above, downstream end portions of the two branched passages 44*b*, 44*c* are respectively connected to the first introduction portion 38*c* and the second introduction portion 38*d* that are formed on the upper surface of the surge tank 38.

During the natural aspiration, the gas that flows into the bypass passage 40 flows through each of the portions 41 to 44 constituting said passage 40 and reaches each of the cylinders 11.

That is, the gas that flows through the throttle valve 32 flows into the valve body 41*a* of the bypass valve 41 from the intermediate portion of the first passage 33 according to the opening amount of the bypass valve 41.

As indicated by an arrow A6 in FIG. 12, the gas that flows through the valve body 41*a* and flows into the bent pipe portion 42 flows vertically upward, and then flows rightward while flowing slightly rearward.

Figure 15:
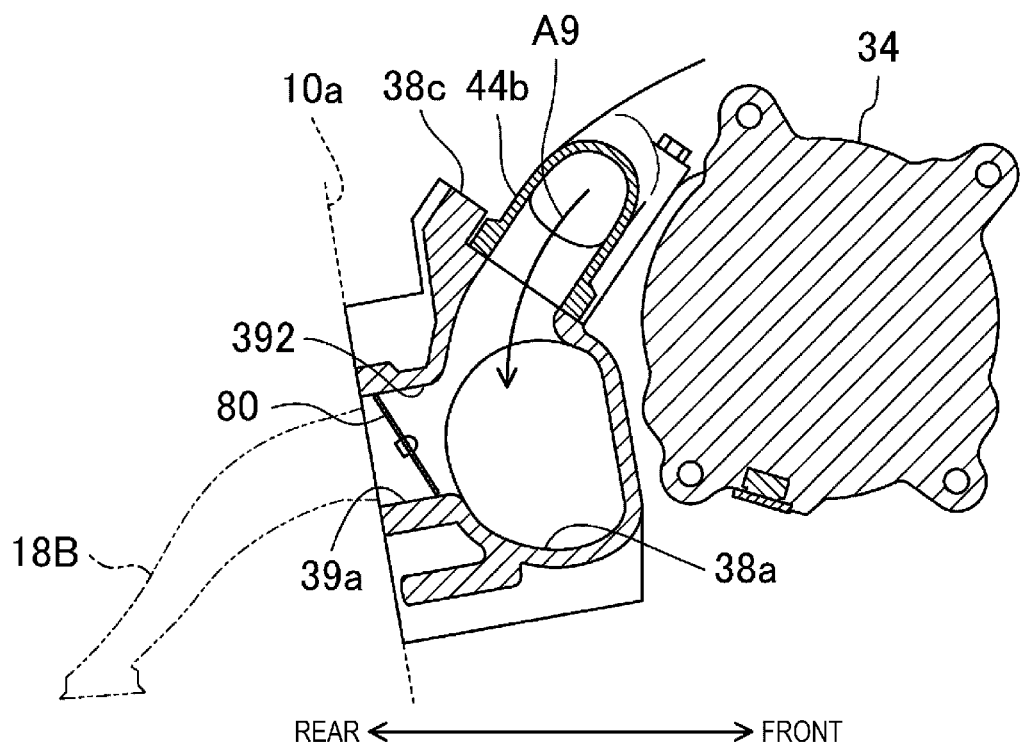
FIG. 15 is a transverse cross-sectional view of the connection structure of the surge tank and the bypass passage.

Next, as indicated by an arrow A7 in FIG. 12, the gas that flows through the bent pipe portion 42 flows rightward along the straight pipe portion 43 and thereafter flows into the branched pipe portion 44. Then, as indicated by arrows A8 to A10 in the same drawing, the gas that flows into the branched pipe portion 44 flows through the bent passage 44*a* and is then divided into the first branched passage 44*b* and the second branched passage 44*c*, and the divided gas flows into the surge tank 38 (also see arrows A9 to A10 in FIG. 14 to FIG. 15). While the gas that flows into the surge tank 38 is merged into the gas that flows thereinto via the introduction portion 37*b*, the gas is supplied to each of the cylinders 11 via the independent passages 39. Note that, of the gas that flows into the branched pipe portion 44, the gas that flows through the first branched passage 44*b* is directed to the right side in the cylinder array direction according to an extending direction of said first branched passage 44*b*, and the gas that flows through the second branched passage 44*c* is directed to the left side in the cylinder array direction according to according to an extending direction of said second branched passage 44*c*.

On the contrary, during the supercharging, the gas that flows reversely from the surge tank 38 to the bypass passage 40 flows through each of the portions 41 to 44 in the bypass passage 40 in a reverse direction and flows into the first passage 33.

(Configuration Relating to Reverse Flow of Condensed Water)

The engine 1 includes the ECU for operating said engine 1. Based on detection signals output from various sensors, the ECU determines an operation state of the engine and calculates a control amount of each of various actuators. Then, the ECU outputs a control signal that corresponds to the calculated control amount to the injector 6, the ignition plug 25, the electric intake VVT 23, the electric exhaust VVT 24, the fuel supply system 61, the throttle valve 32, the EGR valve 54, the electromagnetic clutch 34*a* of the supercharger 34, and the bypass valve 41 so as to operate the engine 1.

By the way, when the engine 1 is operated and the gas that contains moisture like the fresh air or the external EGR gas is cooled by the intercooler 36, condensed water resulted from the moisture is produced in the passage on the downstream side of the intercooler 36.

In a general engine, the surge tank is arranged on the downstream side of the intercooler. Thus, it is common that such condensed water is produced in the surge tank and accumulated on a bottom portion of the surge tank.

However, as in this configuration example, in the case where the intercooler 36 is arranged below the surge tank 38, the condensed water that flows down by gravity is possibly accumulated in a bottom portion of the intercooler 36. In such a case, for example, when a load of the engine 1 is increased, and the flow rate of the gas suctioned from the outside is increased, a large amount of the condensed water is introduced from the intercooler 36 into combustion chamber 16 via the surge tank 38 and the intake ports 17, 18, which possibly causes water hammer phenomenon. This is inconvenient when sufficient durability of the engine 1 is desirably secured.

To handle such a problem, it is considered to align the surge tank 38 and the intercooler 36 horizontally so as to prevent a reverse flow of the condensed water to the intercooler. However, such a layout is not preferred because the entire engine is enlarged and the arrangement of the entire air intake passage is interfered.

In addition, as disclosed in PTL 2, it is considered to communicate between a lower portion of the intercooler 36 and the third passage 37 on the downstream side of the intercooler 36 by using a communication pipe. However, such a communication pipe only functions when the sufficient flow rate is secured in the intercooler 36. Accordingly, as in this configuration example, in the case where the bypass passage 40, which bypasses the intercooler 36, is provided in addition to the passage passing through the intercooler 36, the flow rate through the intercooler 36 fluctuates significantly depending on the operation state of the engine 1. Thus, it is inconvenient for stably drawing the condensed water.

In view of the above, a reverse flow prevention structure that suppresses the reverse flow of the moisture from the flow of the gas is formed in a section from an upstream end portion of the third passage 37 to a connected portion between the downstream end portion of said third passage 37 and the surge tank 38 (in this configuration example, corresponding to the sections S1 to S2 in FIG. 8). More specifically, as illustrated in FIG. 8 to FIG. 9 and FIG. 14, the reverse flow prevention structure is constructed of the pair of the wall portions 71, 72 formed in a peripheral edge of the introduction port 38*b* of the surge tank 38, so as to catch the moisture that flows reversely from the flow of the gas.

According to this configuration, in the air intake passage 30, the reverse flow prevention structure is formed in the section that includes the passage on the downstream side of the intercooler 36. Thus, the reverse flow prevention structure can catch the condensed water that is produced in the surge tank 38 or flows into the surge tank 38 from the outside. More specifically, the wall portion 71 as the reverse flow prevention structure catches the condensed water, which is accumulated in the right portion of the bottom surface 38*a* of the surge tank 38, on a right surface 71*a* of said the wall portion 71. Similarly, the wall portion 72, which is paired with the wall portion 71, catches the condensed water, which is accumulated in the left portion of the bottom surface 38*a* of the surge tank 38, on a left surface 72*a* of said the wall portion 72. In this way, it is possible to suppress the reverse flow of the condensed water and to further suppress occurrence of the water hammer phenomenon.

The formation of the reverse flow prevention structure and the vertical alignment of the surge tank 38 and the intercooler 36 can be achieved simultaneously. Even in the case where the condensed water flows downward by the gravity, the condensed water can be caught by the reverse flow prevention structure before reaching the intercooler 36. This is advantageous for configuring the compact engine 1.

Just as described, the occurrence of the water hammer phenomenon resulted from the condensed water can be suppressed while the engine 1 can be configured to be compact.

As illustrated in FIG. 8 to FIG. 9 and FIG. 14, each of the paired wall portions 71, 72 as the reverse flow prevention structure is formed around the introduction port 38b of the surge tank 38. Thus, for example, compared to a configuration that each of the wall portions 71, 72 is formed in an intermediate portion of the third passage 37, it is possible to retain the condensed water near the intake ports 17, 18. As a result, by using a flow of the intake air that flows into the surge tank 38, the condensed water can smoothly be introduced into the combustion chamber 16. This is advantageous for keeping a stored amount of the condensed water to be small.

As illustrated in FIG. 14, each of the first introduction portion 38c and the second introduction portion 38d is offset from both of the introduction port 38b of the surge tank 38 and the pair of the wall portions 71, 72 in the cylinder array direction.

For example, in the case where the first introduction portion 38c and the introduction port 38b are arranged at the same positions in the cylinder array direction, the moisture that is contained in the gas introduced from the bypass passage 40 and is condensed possibly flows down to the intercooler 36 through the introduction port 38b without dropping on the bottom surface 38a on the right side of the wall portion 71.

On the contrary, as illustrated in FIG. 14, the first introduction portion 38c is offset from both of the introduction port 38b and the pair of the wall portions 71, 72. Accordingly, even in the case where the moisture that is contained in the gas introduced into the surge tank 38 from the bypass passage 40 is condensed in the surge tank 38, such condensed water is produced at the position that is offset from both of the introduction port 38b and the pair of the wall portions 71, 72 in the cylinder array direction. As a result, the pair of the wall portions 71, 72 can catch the condensed water. The same applies to the second introduction portion 38d.

The downstream end of the EGR passage 52 is connected to the portion of the air intake passage 30 on the upstream side of the upstream end of the bypass passage 40.

When such connection is made, as illustrated in FIG. 1 and the like, the external EGR gas that contains the moisture flows through the bypass passage 40. Since it is configured that the EGR gas flows not only through the passages on the supercharging side that pass through the intercooler 36 and the supercharger 34 but also through the bypass passage 40, such a configuration can reduce the amount of the condensed water that is produced when the gas is cooled in the intercooler 36.

Since the reverse flow prevention structure is constructed of the pair of the wall portions 71, 72, which is vertically provided in the manner to rise from the bottom surface 38a of the surge tank 38 along the flow direction of the gas, the gas can smoothly flow along these wall portions 71, 72. This can prevent such a situation where, as a result of collision of the gas against the wall portion, for example, the wall portion acts as an impactor and the condensed water is unintentionally produced.

Furthermore, with such a configuration, the reverse flow prevention structure can be configured without increasing intake air resistance. That is, it is possible to simultaneously prevent the reverse flow of the condensed water and suppress the intake air resistance.

Other Embodiments

In the embodiment, the description has been made on the configuration that the pair of the wall portions 71, 72 as the reverse flow prevention structure is formed around the introduction port 38b of the surge tank 38. However, the invention is not limited to this configuration. A position where the reverse flow prevention structure is formed can be in a section from the upstream end portion of the third passage 37 to a portion around the introduction port 38b of the surge tank 38.

Figure 16:
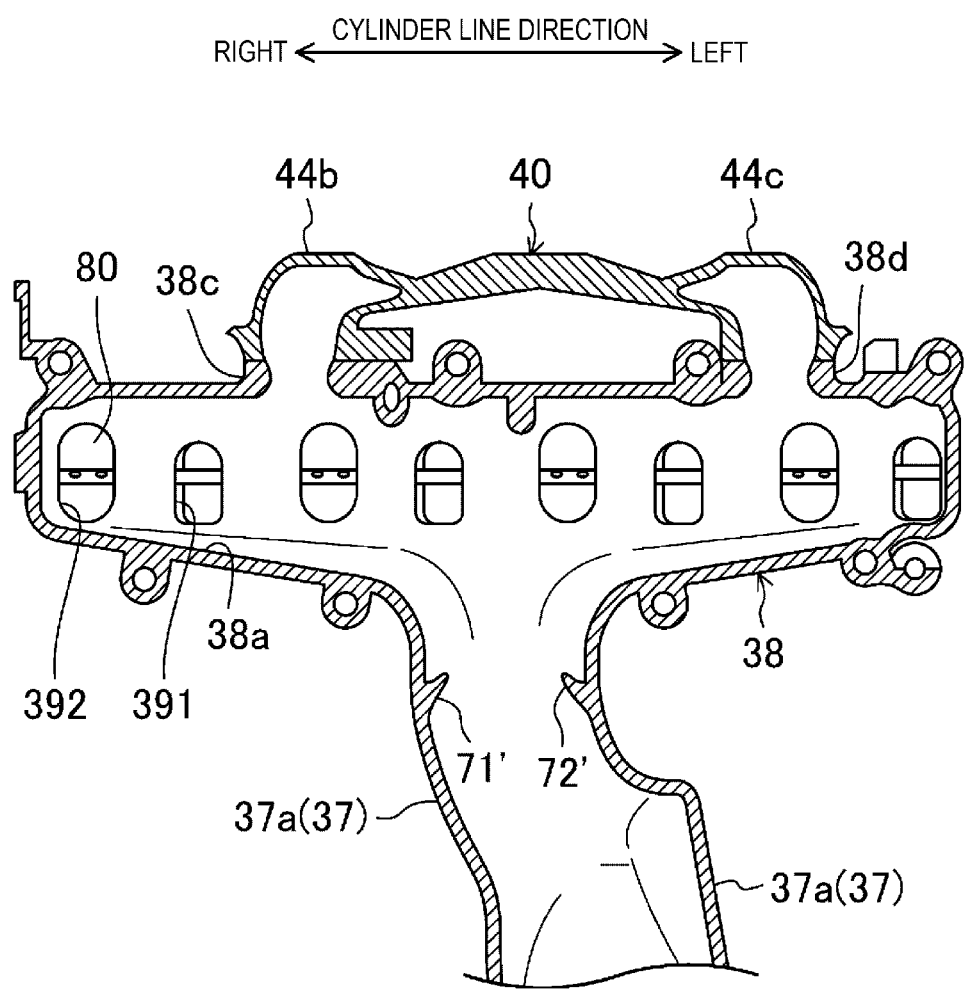
FIG. 16 is a view for illustrating a modified example of a reverse flow prevention structure and corresponding to FIG. 14.

FIG. 16 is a view for illustrating a modified example of the reverse flow prevention structure and corresponding to FIG. 14. As illustrated in FIG. 16, a pair of wall portions 71', 72' as the reverse flow prevention structure may be formed in the intermediate portion of the third passage 37. As a further modified example, for example, the reverse flow prevention structure may be arranged in both of the surge tank 38 and the third passage 37.

REFERENCE SIGNS LIST

1: Engine
10: Engine body
11: Cylinder (cylinder)
17: First port (intake port)
18: Second port (intake port)
30: Air intake passage
32: Throttle valve
34: Supercharger
36: Intercooler
37: Third passage (introduction passage)
38: Surge tank
38b: Introduction port
39: Independent passage
40: Bypass passage
41: Bypass valve
44b: First branched passage
44c: Second branched passage
52: EGR passage
71: Wall portion (reverse flow prevention structure)
72: Wall portion (reverse flow prevention structure)

What is claimed is:

1. An air intake passage structure for an engine comprising:
an intake port that communicates with a combustion chamber; and
an air intake passage in which an intercooler and a surge tank are sequentially provided from an upstream side along a flow direction of gas, and in which a downstream end portion is connected to the intake port, wherein
the air intake passage is arranged such that the intercooler is positioned below the surge tank in a vehicle-mounted state, and has an introduction passage that connects the intercooler and a bottom surface of the surge tank, the surge tank has an introduction port connected to a downstream end of the introduction passage and a reverse flow prevention structure that suppresses a reverse flow of moisture from a flow of the gas, and the reverse flow prevention structure is formed around a peripheral edge of the introduction port of the surge tank and includes a wall portion rising upward from an inner bottom surface of the surge tank.

2. The air intake passage structure for the engine according to claim 1, wherein the reverse flow prevention structure is arranged in a section from an upstream end portion of the introduction passage to a connected portion between a downstream end portion of the introduction passage and the surge tank, and is configured to catch the moisture that flows reversely from the flow of the gas.

3. The air intake passage structure for the engine according to claim 2, wherein the introduction passage is connected to the surge tank via an introduction port formed in the bottom portion of the surge tank, and the reverse flow prevention structure is formed around the introduction port.

4. The air intake passage structure for the engine according to claim 3, wherein the engine has plural cylinders that are arranged in line, the surge tank extends in a cylinder array direction, the air intake passage has:
  a supercharger provided on an upstream side of the intercooler; and
  a bypass passage that is branched on an upstream side of the supercharger, bypasses the supercharger and the intercooler, and is connected to the surge tank, and
a connected portion between the bypass passage and the surge tank is set at a position that is offset from both of the introduction port and the reverse flow prevention structure in the cylinder array direction.

5. The air intake passage structure for the engine according to claim 4 further comprising:

an exhaust passage through which burnt gas exhausted from the combustion chamber flows; and an exhaust gas recirculation passage that connects the exhaust passage and the air intake passage, and partially recirculates the burnt gas into the air intake passage, wherein a downstream end of the exhaust gas recirculation passage is connected to a portion of the air intake passage on an upstream side of an upstream end of the bypass passage.

6. The air intake passage structure for the engine according to claim 1, wherein the introduction passage includes a collection portion where the gas having flown through the intercooler is collected and an introduction portion where the collected gas is guided to the surge tank, and the introduction portion is formed such that an upstream portion thereof extends obliquely upward from a connected portion to the collection portion and a downstream portion thereof extends vertically upward toward a connected portion to the surge tank.

7. The air intake passage structure for the engine according to claim 1, wherein the air intake passage includes at least one independent passage which connects between a downstream side of the surge tank and an intake port of a cylinder of the engine;

a downstream end portion of the introduction portion extends in a direction substantially orthogonal to a flow direction of the gas in the independent passage.

8. The air intake passage structure for the engine according to claim 1, wherein the introduction port has a substantially circular cross section which opens in a central portion of the inner bottom surface of the surge tank, a downstream end of the introduction passage is connected to the surge tank through the introduction port; and the reverse flow prevention structure includes the wall portion formed on one side and other side of the introduction port where the one side is an opposite side of the other side across the introduction port.

9. The air intake passage structure for the engine according to claim 8, wherein the engine has plural cylinders arranged in a cylinder array direction, the surge tank extends in the cylinder array direction, the introduction port is provided at a central portion of the surge tank in the cylinder array direction, and the wall portion is provided on the one side and the other side of the introduction port along the cylinder array direction.

10. An air intake passage structure for an engine comprising:

an intake port that communicates with a combustion chamber; and an air intake passage in which an intercooler and a surge tank are sequentially provided from an upstream side along a flow direction of gas, and in which a downstream end portion is connected to the intake port, wherein the air intake passage is arranged such that the intercooler is positioned below the surge tank in a vehicle-mounted state, and has an introduction passage that connects the intercooler and a bottom surface of the surge tank, the surge tank has an introduction port connected to a downstream end of the introduction passage and a pair of walls projected vertically upward from an inner bottom surface of the surge tank around the introduction port for suppressing a reverse flow of moisture from a flow of the gas.

* * * * *